June 22, 1937.  A. BAUMANN ET AL  2,084,831
CALCULATING MACHINE
Filed March 29, 1929   14 Sheets-Sheet 2
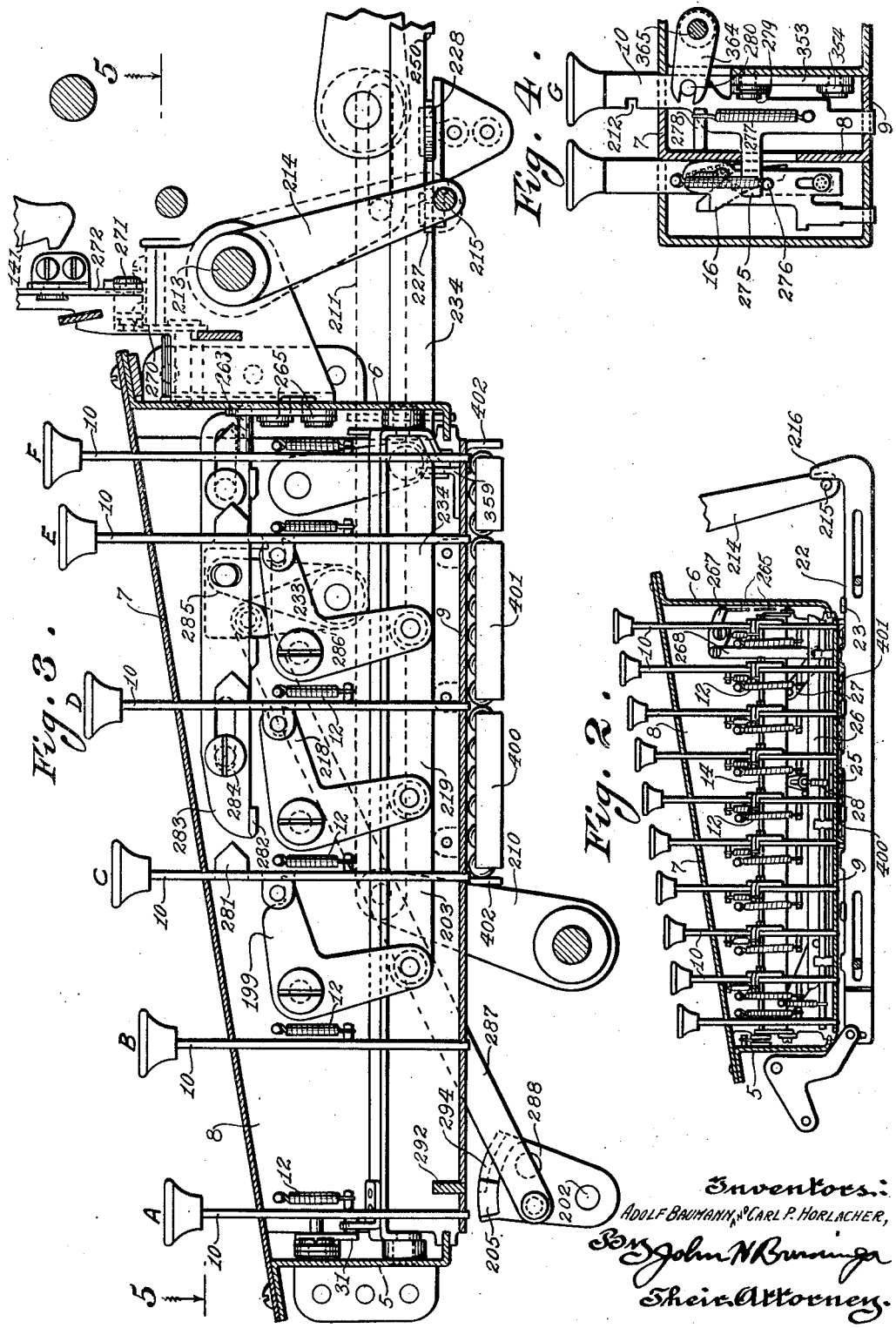

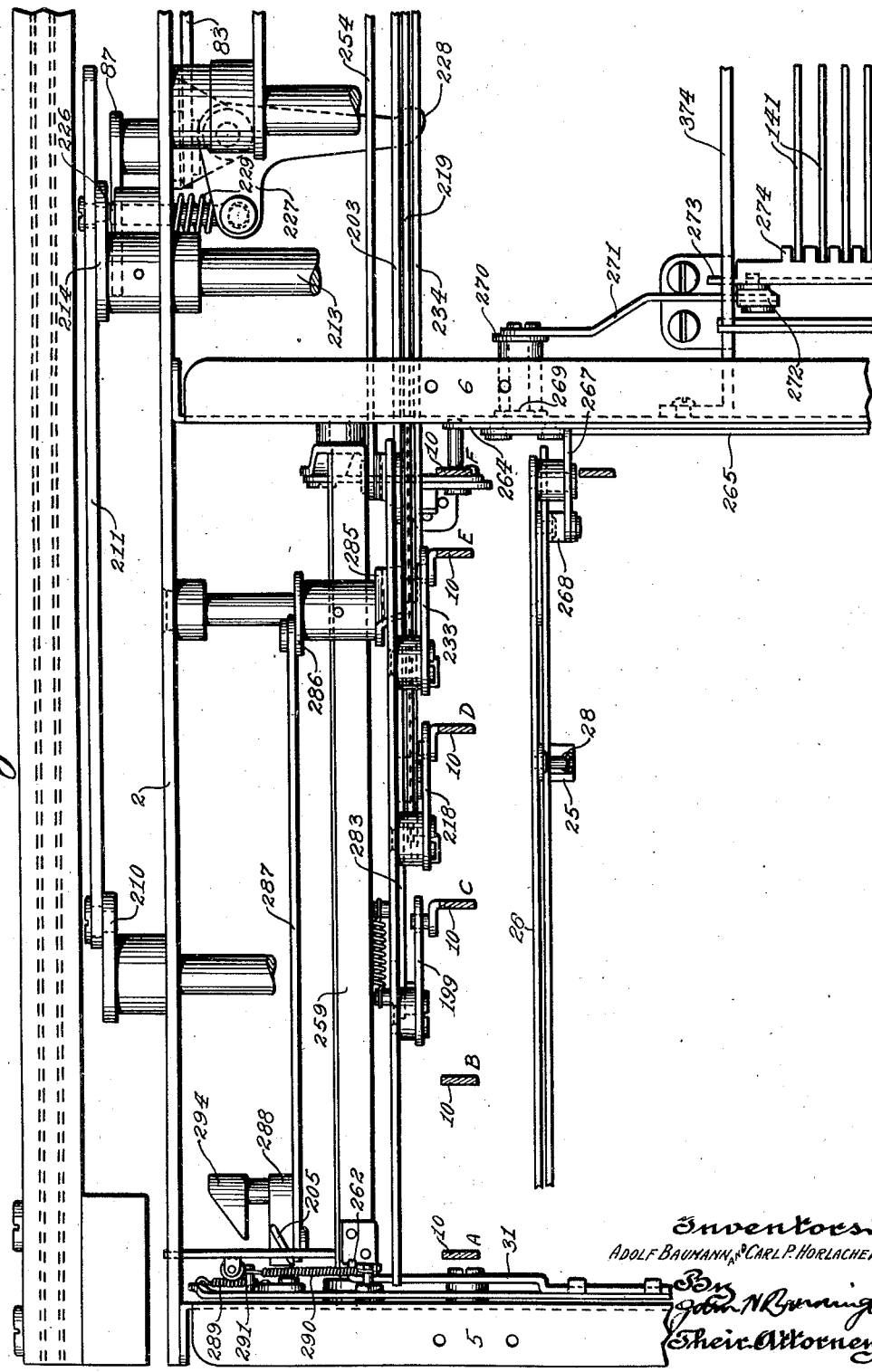

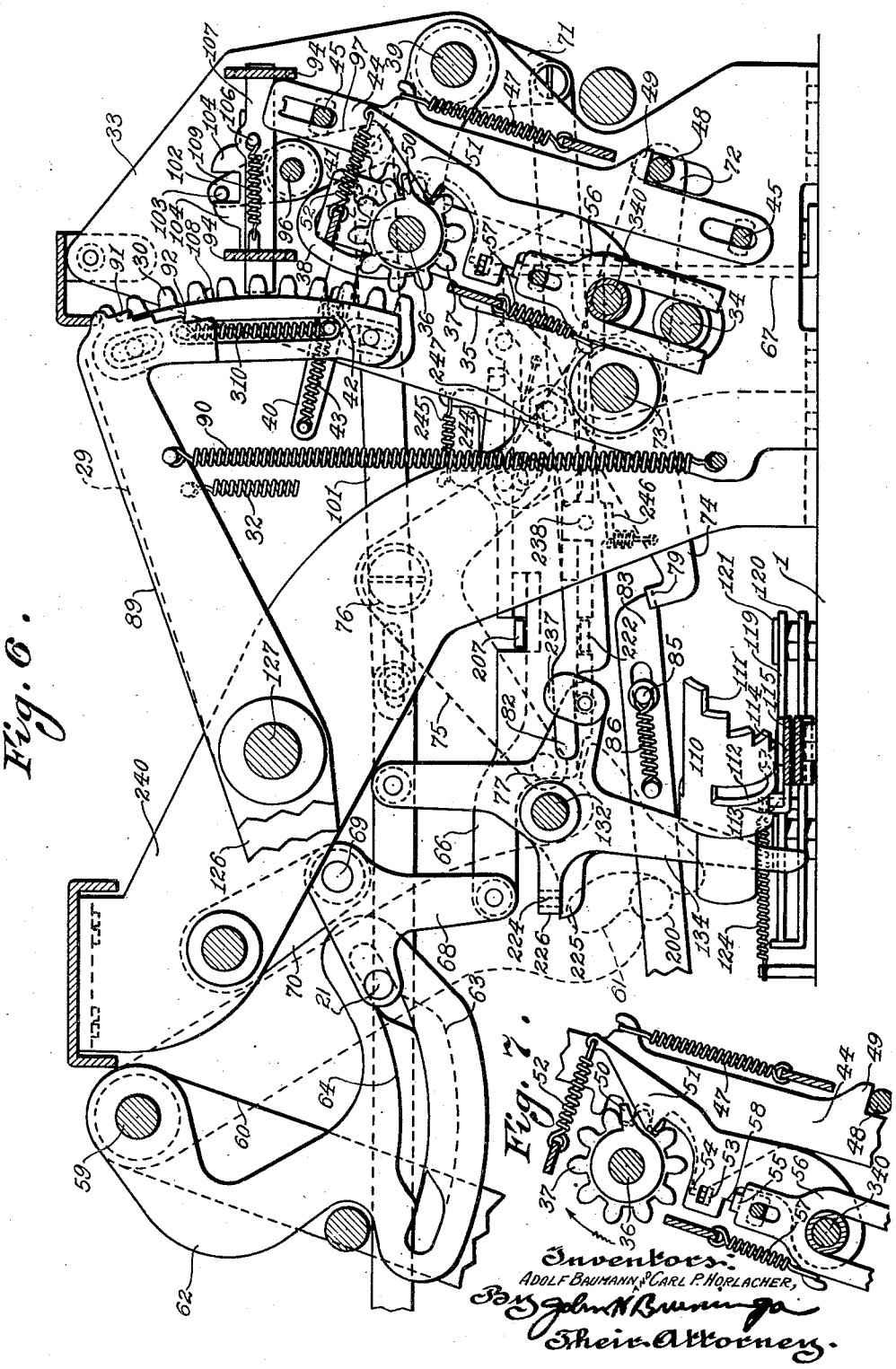

Fig. 8.

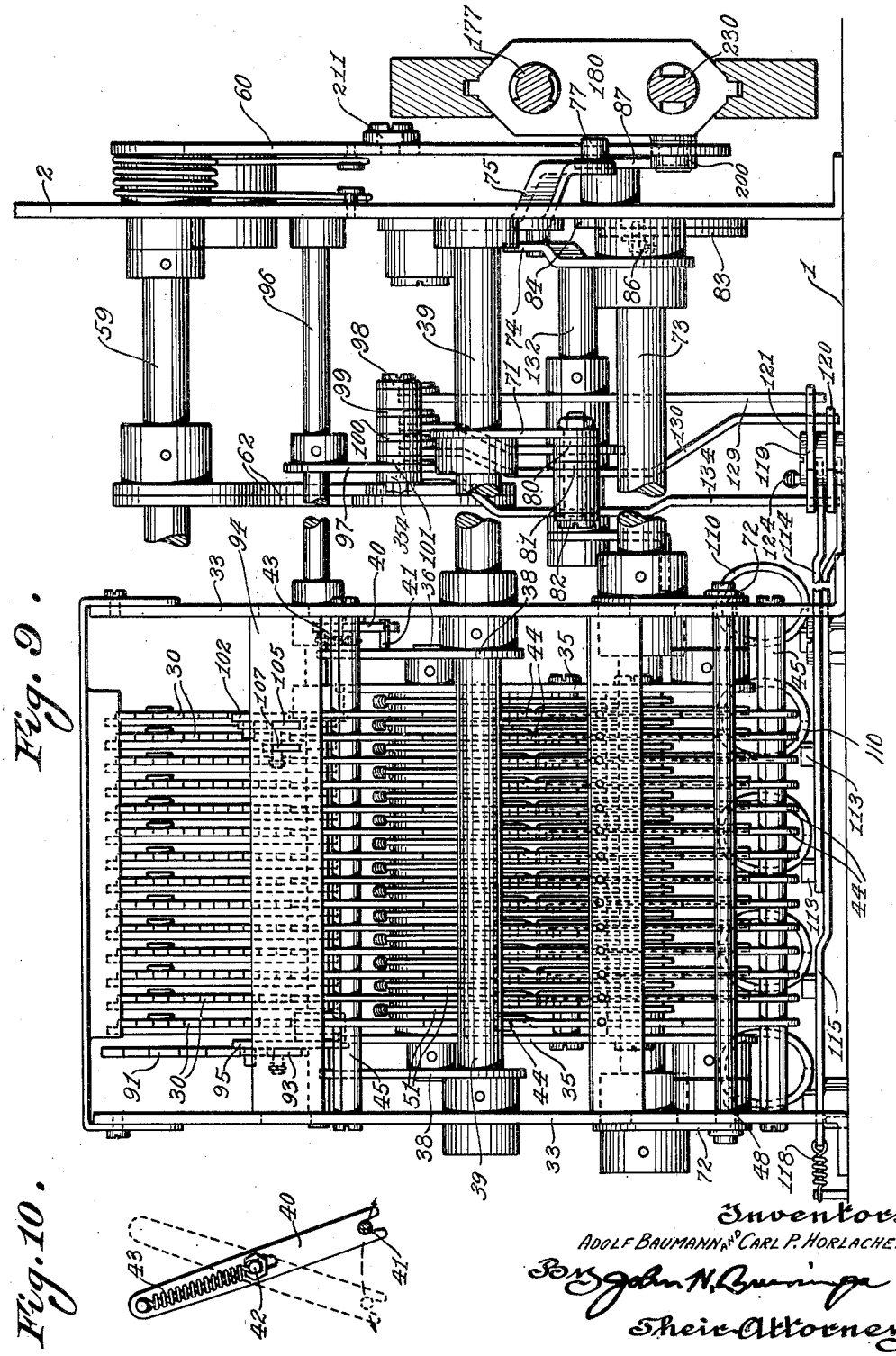

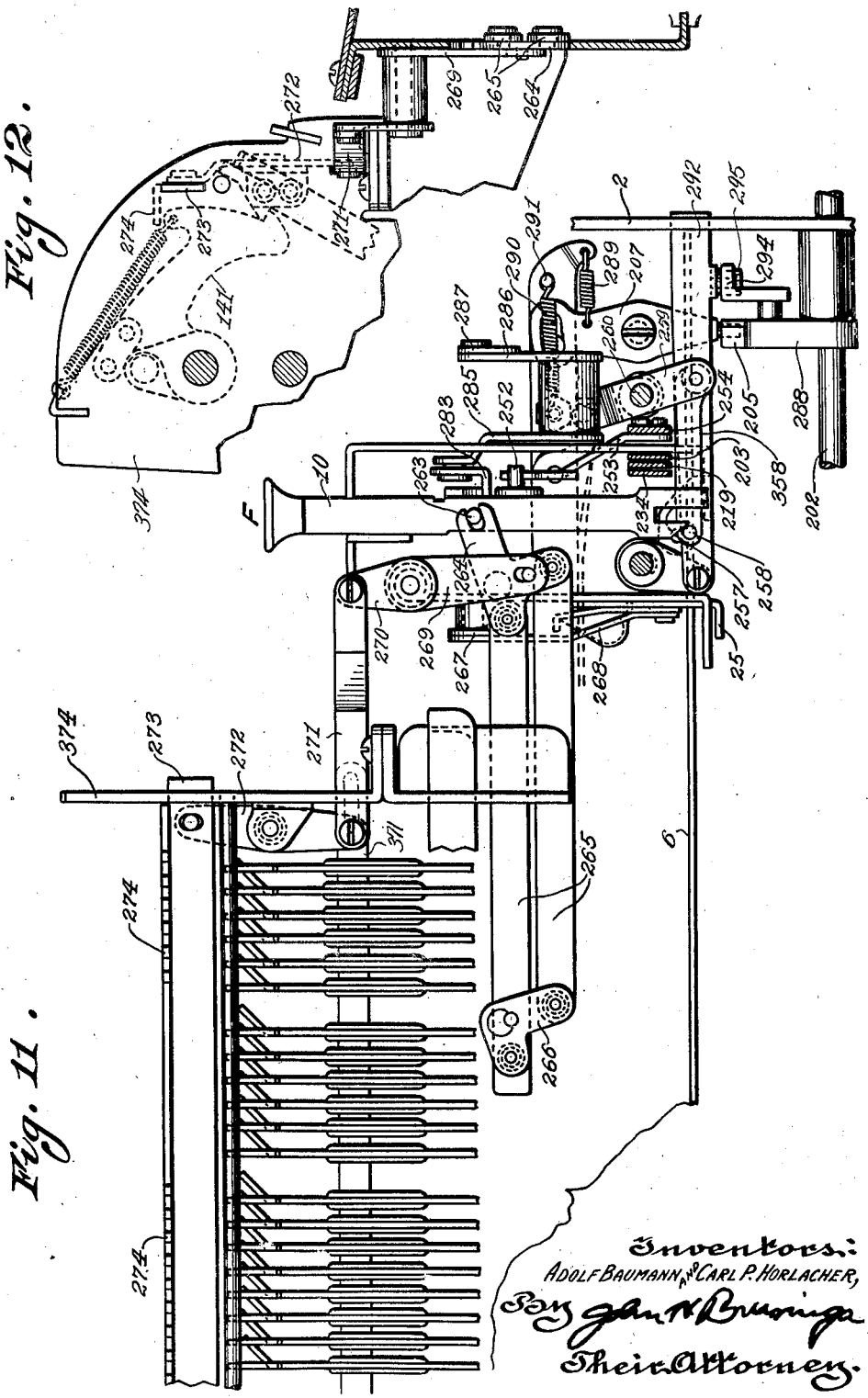

June 22, 1937.  A. BAUMANN ET AL  2,084,831
CALCULATING MACHINE
Filed March 29, 1929  14 Sheets-Sheet 8

Inventors:
ADOLF BAUMANN, and CARL P. HORLACHER,
Their Attorney.

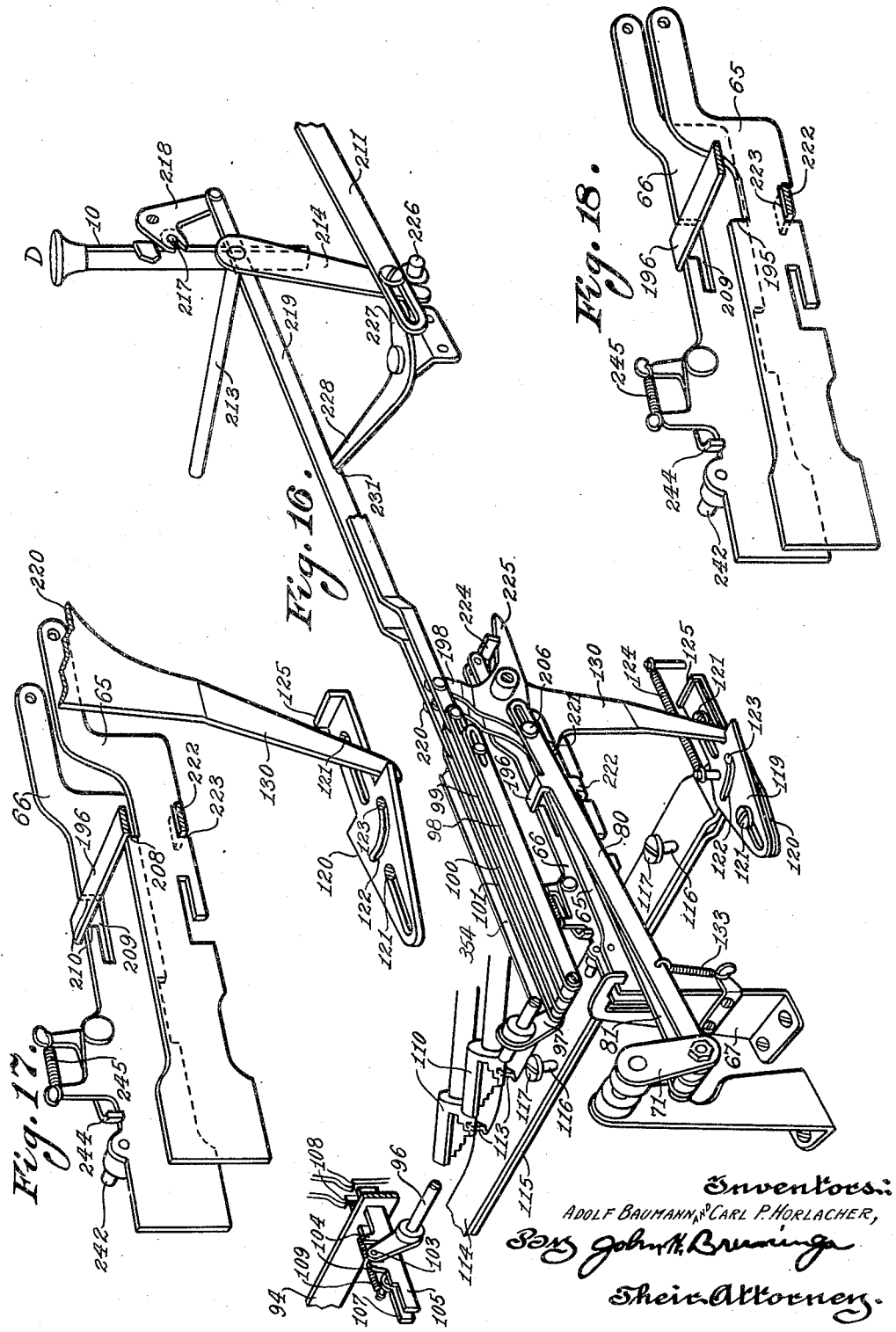

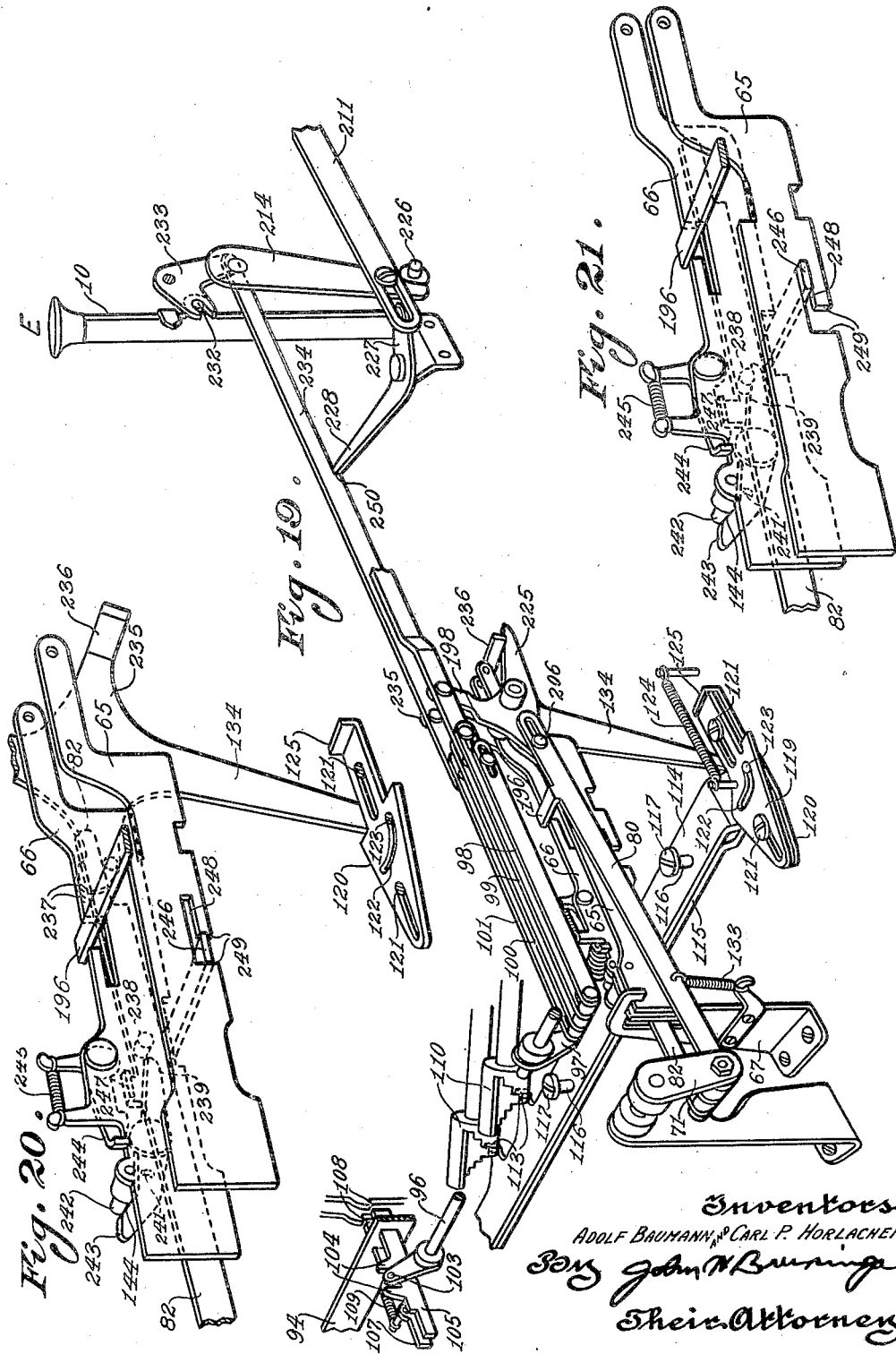

June 22, 1937.  A. BAUMANN ET AL  2,084,831
CALCULATING MACHINE
Filed March 29, 1929     14 Sheets-Sheet 11
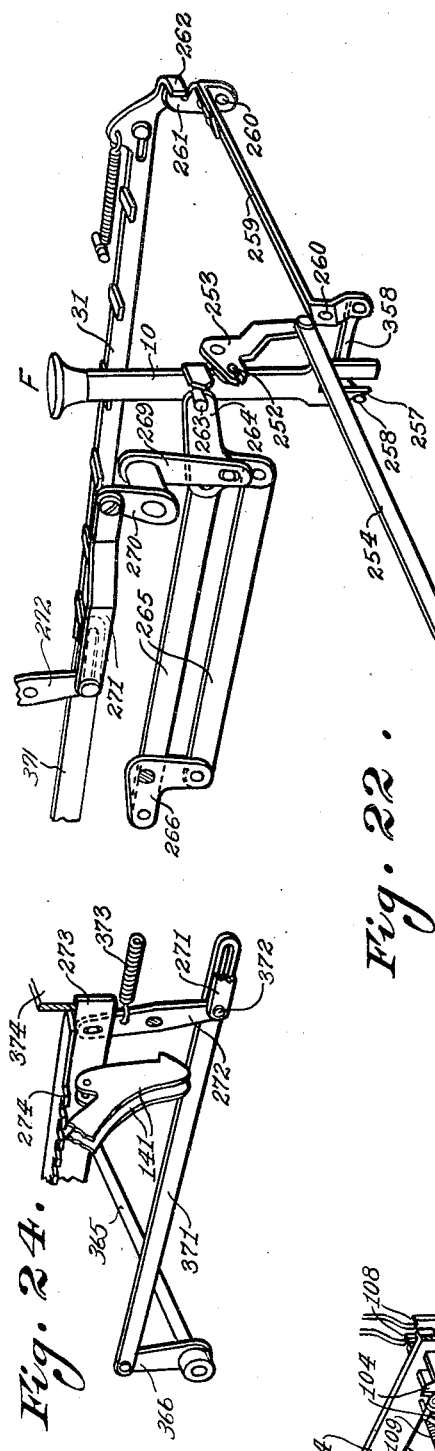
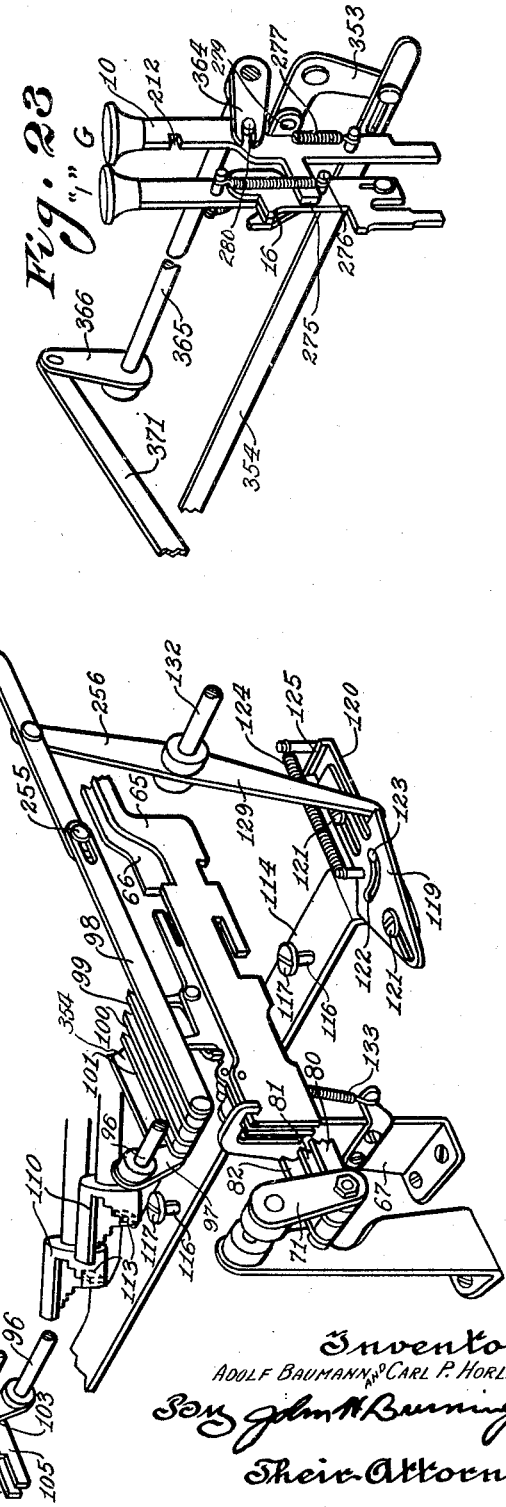
Inventors:
Adolf Baumann and Carl P. Horlacher,
Their Attorney.

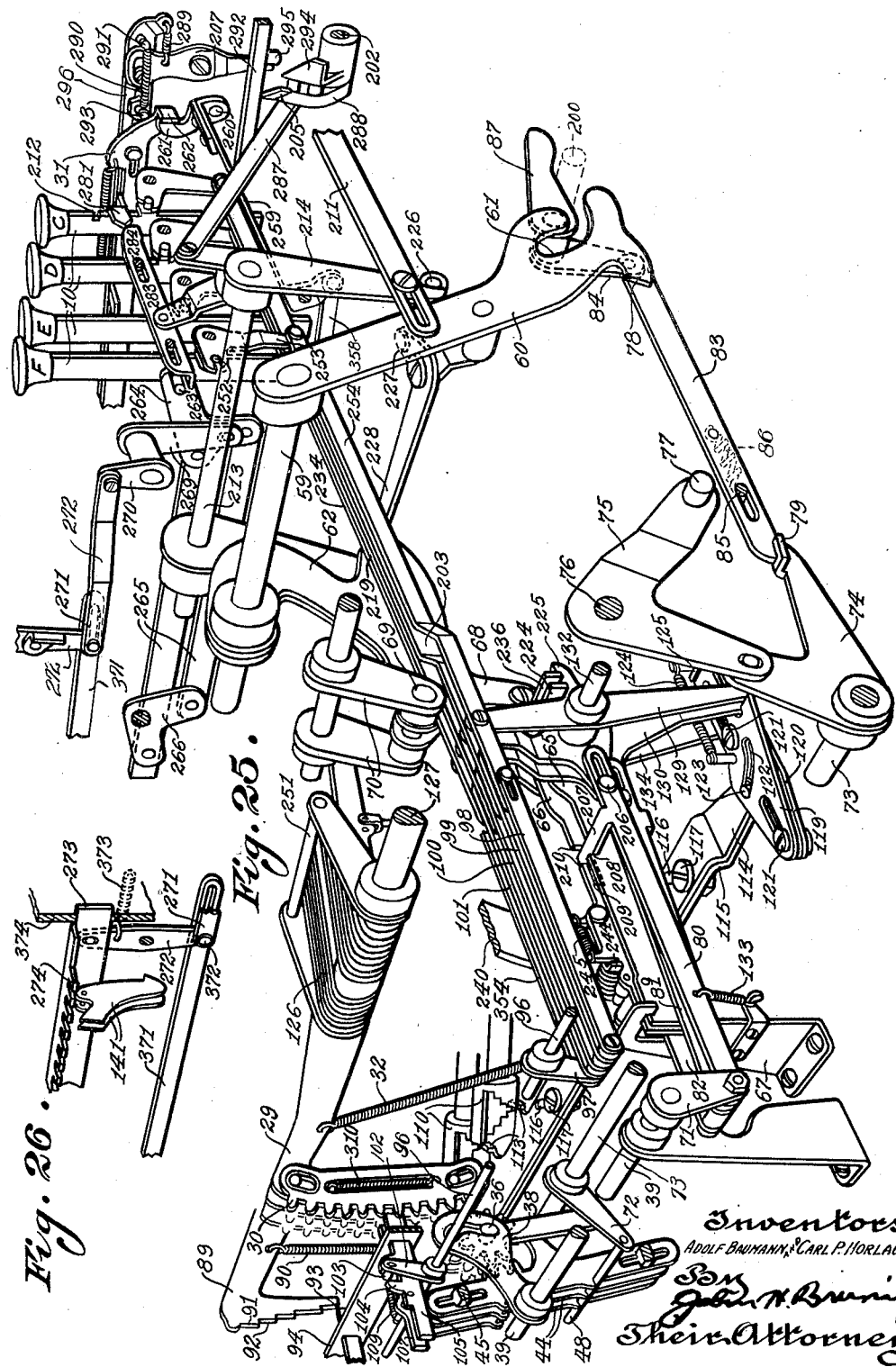

June 22, 1937.  A. BAUMANN ET AL  2,084,831
CALCULATING MACHINE
Filed March 29, 1929  14 Sheets-Sheet 13

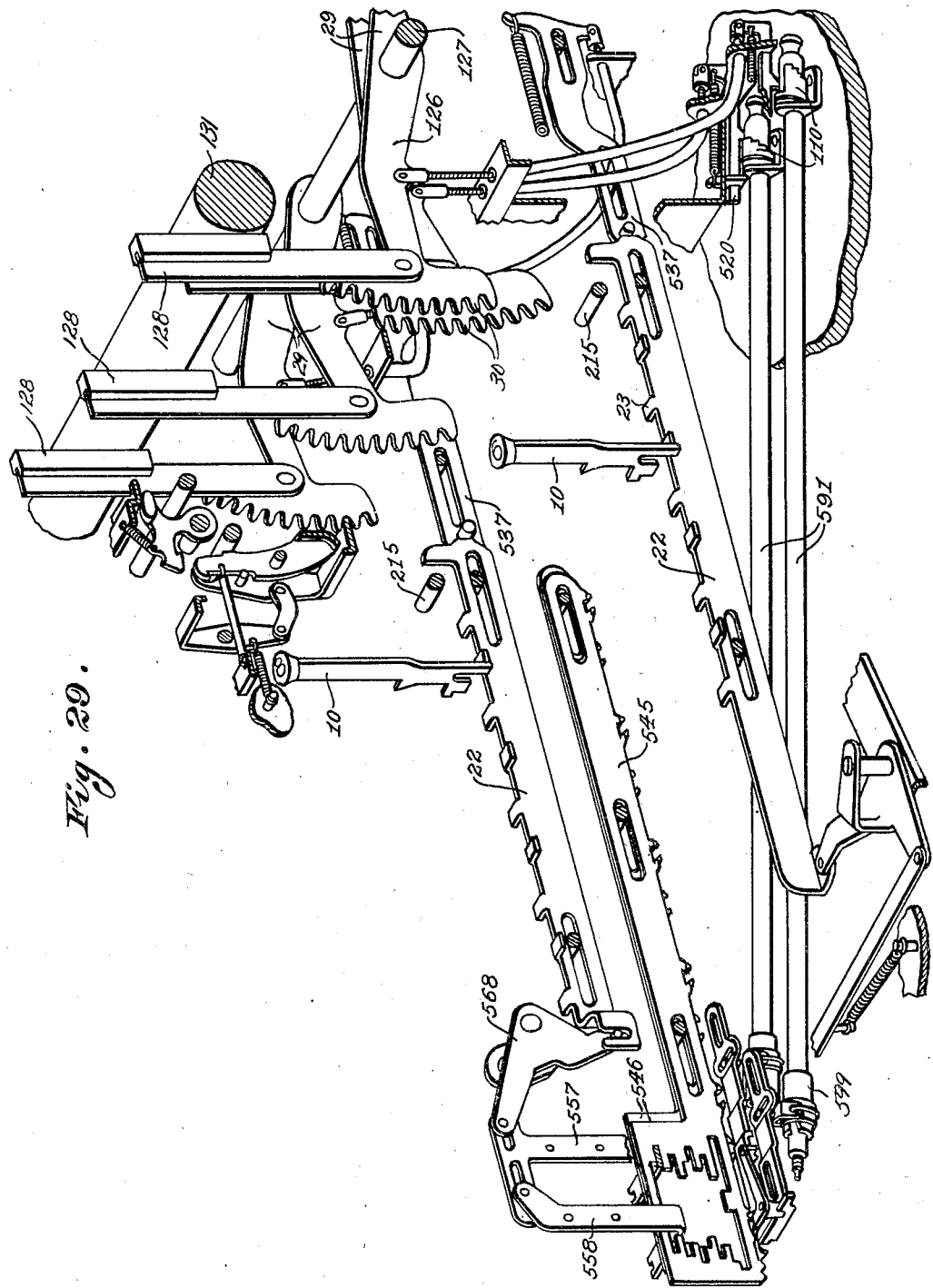

Patented June 22, 1937

2,084,831

UNITED STATES PATENT OFFICE 2,084,831

CALCULATING MACHINE

Adolf Baumann and Carl P. Horlacher, St. Louis, Mo., assignors, by mesne assignments, to Remington Rand Inc., a corporation Application March 29, 1929, Serial No. 351,058

9 Claims. (Cl. 235—58)

This invention relates to calculating machines and more particularly to machines of the general character disclosed in U. S. Patent No. 1,886,148, issued November 1, 1932 corresponding to British Patent No. 307,407.

In the calculating machines as described in the applications referred to, selective manipulative means is provided for setting up multiplicands and multipliers and devices are controlled thereby for setting up the various resulting partial products which are then integrated into the final product. Devices are provided for printing the several multiplicands, multipliers and their corresponding products in listing relation, and means is provided for actuating the printing devices in coordination and in accordance with the settings of the selective multiplying means and the integrating means.

The general purpose of this machine is to provide a machine of the character described in which the computations which can be performed and listed are extended and increased so as to adapt the machine for general use in the calculating and accounting fields.

With this purpose in view, one of the objects of this invention is to provide a machine of the character described in which the final products can be accumulated so that a total of a series of products can be secured.

Another object is to provide a machine of the character described having selective manipulative means whereby selected products may, or may not, be accumulated or added to those previously set into the machine at the will of the operator.

Another object is to provide a machine of the character described whereby a number set into the machine may be added to those items previously accumulated therein.

Another object is to provide a machine of the character described whereby a number set into the machine may be subtracted from the items previously accumulated therein.

Other objects are to provide selective manipulative means whereby a total or a subtotal may be taken at any time.

Another object is to provide means whereby the various items set into the machine are printed in listing relation, the printing devices being actuated in coordination and in accordance with the settings of the mechanisms representative of such items, as for instance, the multiplicands, the multipliers, the products, the additions and subtraction.

Another object is to provide a machine of the character described having printing means for designating the operations performed, such as, multiplication, accumulation or non-accumulation, addition, subtraction, and the taking of a subtotal or total.

Another object is to improve the machine as to details in order to improve its operation and simplify its construction.

Further objects will appear from the detail description taken in connection with the accompanying drawings, in which:

Figure 2 is a detail section taken partly on the line 2—2, Figure 1, showing one of the keyboard sections;

Figure 3 is a section on the line 3—6, Figure 1;

Figure 4 is a section on the line 4—4, Figure 1;

Figure 5 is a section on the line 5—5, Figure 3, showing parts embodying this invention in elevation;

Figure 6 is a section on the line 3—6, Figure 1, continued with reference to Figure 3;

Figure 7 is a detail of Figure 6;

Figure 8 is a plan of the parts shown in Figure 6;

Figure 9 is a section on the line 9—9, Figure 1, showing the parts in elevation;

Figure 10 is a detail of Figure 9;

Figure 11 is a section on the line 11—11, Figure 1, showing the mechanism for maintaining certain type bars in inoperative position;

Figure 12 is a side elevation of the parts shown in Fig. 11;

Figures 16, 17 and 18 are perspective views, showing mechanism for taking a sub-total;

Figures 19, 20 and 21 are perspective views, showing mechanism for taking a total;

Figure 22 is a perspective view, showing mechanism for performing subtraction;

Figure 23 is a perspective view, showing mechanism for performing direct addition;

Figure 24 is a perspective view which is a continuation of Figs. 22 and 23.

Figure 25 and Figure 26 are perspective views, showing the various mechanisms of Figs. 13 to 23 inclusive;

Figure 1:
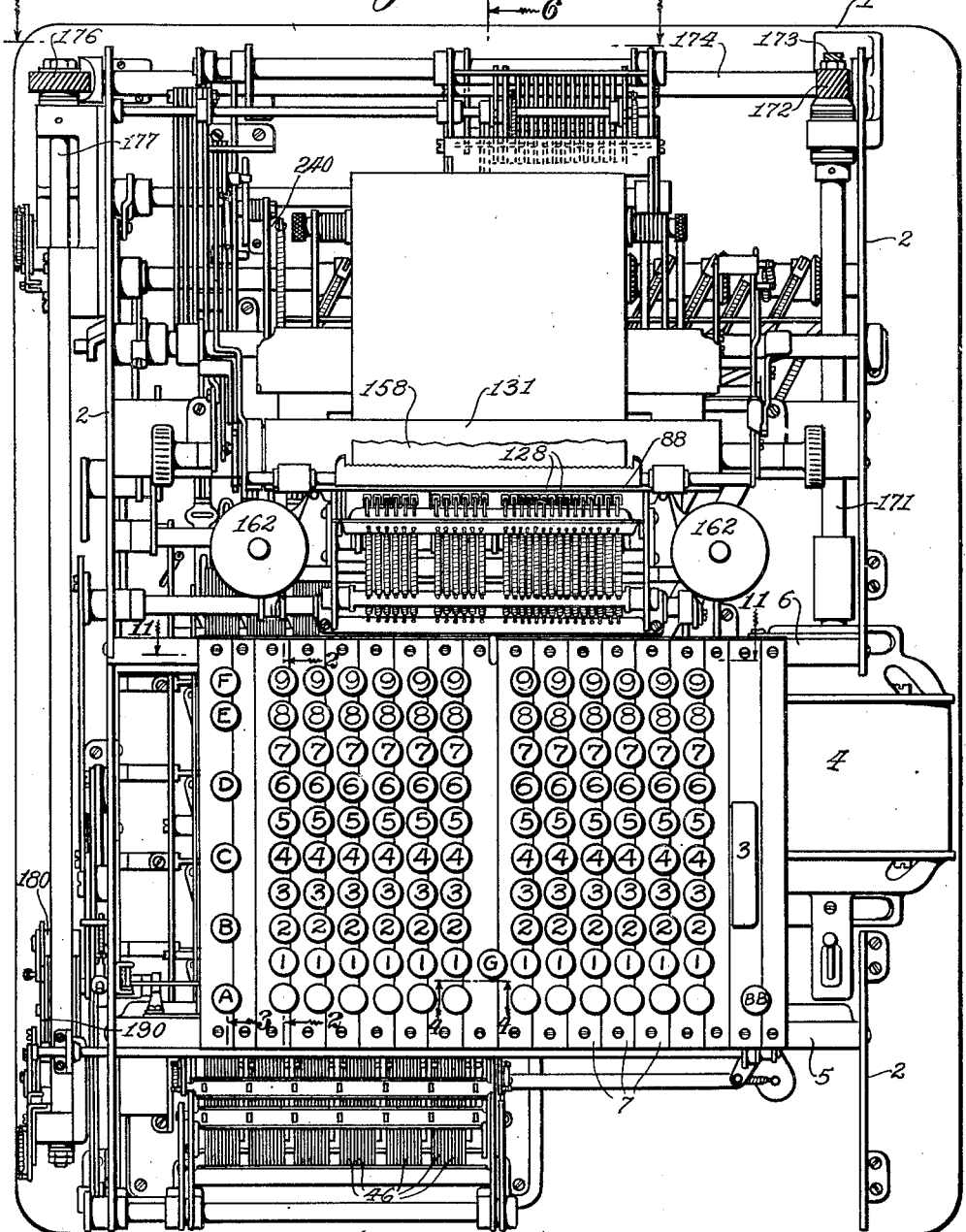
Figure 1 is a plan of a calculating machine embodying this invention.

Figure 29 is a perspective view, somewhat diagrammatic in form, showing the general plan and operation of the mechanism for setting up the multiplicands and multipliers and the product and setting the latter into the printing devices. In this figure, reference numerals have been applied to some parts which are not described in the following specification. In such cases the reference numerals are the same as those applied to the same parts in U. S. Patent No. 1,886,148 except that they have been raised to the range between 500 and 600 in order to distinguish them from similar reference numerals used in the present case.

Preliminary description

Referring to the accompanying drawings, Figures 1 and 2 show, generally the machine disclosed in U. S. Patent No. 1,886,148, issued November 1, 1932 corresponding to British Patent No. 307,407, to which reference is had for further disclosure, but which will be briefly referred to. The machine, generally stated, comprises a base 1, on which are mounted the side plates 2, between which and on the base is mounted the mechanism for securing the result. Suitable supports are provided for the various mechanisms, and in the actual machine there will be provided a cover, as usual, this cover having been, however, omitted to expose the working mechanism.

It will be noted that the machine has two boards of keys, the one on the left being in this embodiment the multipler keys, while the one on the right consists of the multiplicand keys. In each board, the keys are arranged in banks, numbered from "1" to "9", inclusive, corresponding to the nine digits of the numerical system, the zero key being omitted as being unnecessary. There is also in each bank, in front of the "1" key, a key whose function it is to clear the setting in its particular bank. To the left of the multiplier section and to the right of the multiplicand section are keys marked "A"—"BB", whose functions are, each to clear the setting of its particular section. To the left of the multiplier section is a key marked "B", whose function it is to maintain the setting of the multiplier section and permit it to be repeated. To the right of the multiplicand section is a trip bar 3, whose function it is to start the mechanism in operation, which mechanism is in this case operated by an electric motor 4.

Connecting the plates 2 are cross-pieces 5 and 6, which provide supports for the banks of keys. Each key bank consists of a carrier 7, 8, 9, detachably mounted on the cross-pieces 5, 6; in this way a bank of keys may be removed as a unit. The top 7 and bottom 9 are slotted to receive the key shanks 10 which are normally held in raised position by springs 12, while a latch 14, acting over shoulders on the key shanks, serves to hold any key in depressed position.

Arranged below each bank of keys is a stop bar 22, having lugs 23 in the path of the key shanks when depressed, these bars serving to transmit the key settings to the multiplier and multiplicand setting up devices. A stop 25 (Fig. 5) is normally arranged in the path of one of these lugs 23, so as to arrest the bar in zero position; this stop bar is, however, connected with a parallel bar 26 pivoted on links 27 normally held in raised position by a spring 28. The bar 26 is arranged to be struck by any depressed key, so as to depress it in order to cause the stop 25 to move below the lugs 23 and permit free movement of the bar 22 in that key bank until arrested by the shank of a depressed key. Each bar 22 has a lug 216, which lugs are bridged by a cross-bar 215 on arms 214 pivoted on a shaft 213.

The multiplier and multiplicand setting up devices are shown generally at 46, the type bars at 128, the platen at 131, the record at 158, and the ribbon spools at 162. The motor shaft 171 drives the shaft 174 through gearing 172—173, and this in turn drives a screw shaft 177 through gearing 176. A block 180 travels along the frame and serves to operate the various mechanisms, including the shaft 213.

The parts so far described are fully disclosed in the patent above referred to, to which reference is had for details; for convenience, the parts are referred to by the same reference numerals as in said application, which will again be referred to hereinafter.

Selective manipulative means

Referring now to Figure 3, arranged in the bank is a series of keys A, B, C, D, E, F, whose function it is, respectively, to clear the multiplier keys, repeat or maintain the setting of the multiplier section, render the machine non-additive, take a sub-total, take a total, and set the machine to subtract an item. The shanks 10 of these keys are mounted at the top 7 and bottom 9 of the unit 7, 8, 9, as are the other keys, and each is provided with a spring 12. The "Clear" key A and the "Repeat" key B are fully described in Patent No. 1,886,148, so that further description thereof is unnecessary.

Accumulating means

Referring now to Figures 6, 7, 9 and 10, 127 designates the shaft on which the sectors 126 connected with the type bars 128 are mounted, as disclosed in Patent No. 1,886,148. The arms of these sectors however extend rearwardly, as shown at 29, to carry sectors 30, each of which slides on the arm 29 by a pin and slot connection and is retained by a spring 310 to permit yield. Sectors for columns 13 and 14, to be described later, are under tension of a spring 32. (See also Figure 25.)

A frame, consisting of connected side plates 33 mounted on the base 1 is arranged beyond the sectors 30. Pivoted at 34 in this frame is a carrier 35 provided with a shaft 36 having arranged thereon a series of pinions 37 arranged to mesh with the sectors 30. Cams 38 fixed to a shaft 39 co-operate with cam rolls on the ends of the shaft 36 to move the pinions into and out of mesh with the sectors when the shaft 39 is oscillated, as hereinafter described. A retainer 40, having a fork engaging a pin 41 on one of the cams 38, sliding on a stud 42 on the frame 33 and acted upon by a spring 43, serves to yieldingly hold the cams 38 in either of their extreme positions, in order to retain the carrier 35 in either of its positions.

Arranged to mesh with each pinion is a rack 44, sliding on cross-bars 45 connecting the frame sides and spaced relatively by engagement with notches in the cross-bars as is usual in machines of this type. Each rack is moved to depressed position by a spring 47 while these racks are raised by a cross-bar 48 engaging lugs 49 thereon. Each pinion 37 (Fig. 7) has a tooth 50 arranged to engage a pawl 51 pivoted on a bar 340 on the carrier 35 and held by a spring 52 to engage a tooth 50. This pawl has a laterally extending lug 53 normally in the path of a laterally projecting lug 54 on the rack 44 of the next higher order, while the laterally projecting lug 55 on a latch 56 raised by a spring 57 is arranged to take behind a shoulder 58 on the pawl 51. The lug 55 also projects laterally sufficiently to be in the path of the lug 54.

The operation of this mechanism is such that, when the carrier 35 is moved to mesh the pinions 37 with the sectors 30, these pinions will move out of mesh with the racks 44 which are at that time held in raised position by the crossbar 48. The sectors 30 are, therefore, free to turn the pinions to the extents required by the settings. The movement of any pinion beyond the "9" position causes the tooth 50 thereon to swing the pawl 51, which is retained in position by the latch 56. Before the carrier 35 moves back to mesh the pinions 37 with the racks 44, the latter are moved up so that the lugs 53 on the pawls 51, which have not been shifted, will move beneath the lugs 54 of the corresponding racks; the lugs 53 of the pawls which have been shifted will, however, move out of the path of the corresponding lugs 54. Accordingly, as the crossbar 48 moves down, the springs 47 will move the racks which are free, while the others will be retained by the interaction of the lugs 53 and 54; in this way carrying is accomplished from one pinion to the one of the next higher order. At the termination of the downward movement of any freed rack, the lug 54 thereon will engage the laterally extended lug 55 so as to release the pawl and permit it to return to normal position; and upon the next succeeding upward movement of that rack, it is again retained by the interaction of the lugs 53 and 54, unless the corresponding pawl has again been shifted. It will be understood that while the pinions 37 are free to turn when traveling in the direction of the arrow, their return is limited by the interengagement of the teeth 50 with the pawls 51 corresponding to zero position; in that way the settings of the pinions can be transferred to the sectors 30.

*Operating mechanism*

Figure 8:
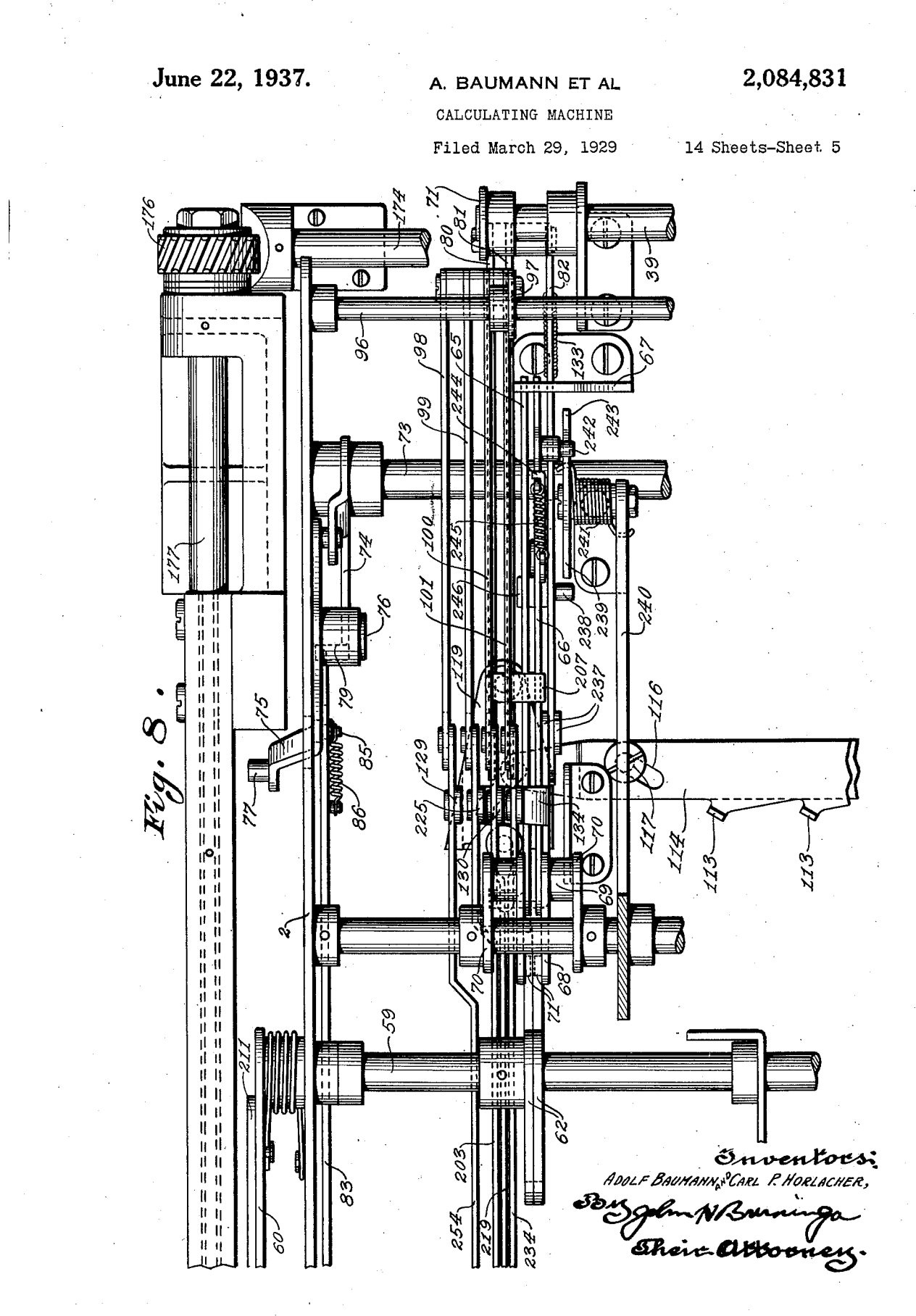

Referring now to Figures 6, 8, 9 and 25, fixed to a shaft 59 is an arm 60, having a slot 61 in the path of a roll 200 on the block 180, whereby upon movement of that block, the arm 60 is moved from full to dotted line position (Fig. 6) and vice versa. The shaft 59 has also fixed thereto an arm 62 provided with cam slots 63 and 64 connected to control the movement of rams 65 and 66 (Fig. 8). These rams are supported by a guide 67 and bell crank levers 68 pivoted at 69 on a bracket 70 and provided with cam rolls 21 engaging the cams. The shaft 39 has an arm 71 to which is pivoted a series of links 80, 81 and 82, whereby, as hereinafter more fully described, the carrier 35 is oscillated through the action of cam arm 38.

The cross-bar 48 (Fig. 25) is carried by arms 72 on a shaft 73 in turn provided with a bell crank lever 74, one arm of which is connected by a pin and slot connection with an arm of a bell crank lever 75 pivoted at 76 on the frame 33 and provided with a pin 77 in the path of a face 78 on the arm 60. The other arm of the bell crank lever 74 has a lug 79 engaged by a latch 83 pivoted on an arm 84 in the frame and guided by a pin 85 in the frame engaging a slot in the latch, this latch being held in retained position by a spring 86. The arm 84 has a connected arm 87 also in the path of the roll 200 on the block 180 (Fig. 9).

Arranged on the extreme right (Figure 1) is a type bar 88, which is connected with a lever 89 on the shaft 127 (Figure 25) and held by a spring 90 against the crossbar 251, which also overlies the arms 126 connected with the other type bars. The lever 89 has a sector 91 provided with a series of steps 92 arranged to co-operate with a stop 93 guided in cross-pieces 94 in the frame 33, connected with an arm 95 on a shaft 96 (Fig. 9), which also has fixed thereto an arm 97 having connected therewith a series of links 98, 99, 100, 101, in turn connected and operated as hereinafter more fully described.

The shaft 96 (Figures 6 and 25) also has an arm 102 provided with a pin 103 moving between lugs 104 on a stop 105 guided in the cross-pieces 94 and connected by a cross-pin 106 to the second stop 107 also guided in the cross-pieces. These stops are arranged to engage shoulders 108 (Fig. 6) on the sectors 30 at the extreme left (Figure 1), so as to arrest these sectors with the type in the zero positions. The stops are urged toward the sectors 30 by a spring 109, and it will be noted that there is lost motion between the pin 103 and the lugs 104, for a purpose hereinafter described.

Referring to Figures 6 and 25, the heads 110 provided with stop shoulders 111 for setting the product type bars (as described in Patent No. 1,886,148) are slotted, as shown at 112, to receive lugs 113 in order to arrest these heads in their nine positions. These lugs 113 are arranged on bars 114 and 115, the bar 115 having lugs co-operating with the heads for setting the first six product type bars from the right (Figure 1), while the lugs on the bar 114 co-operate with the succeeding six heads. Each of these bars 114 has diagonal slots 116 (Figures 8 and 25) co-operating with pins 117 on the base, so that when these bars are moved, they will slide along these slots to move the lugs 113 into and out of the slots 112 in the heads 110. The bar 115 is acted upon by a spring 118 (Figure 9), operating normally to hold its lugs out of the slots. Slides 119 and 120 are mounted on pins 121 on the base 1 (Figures 8, 9 and 25) and are connected to shift the bars 114 and 115, respectively, by a cam 122 in each slide engaging a pin 123 on the bar. A spring 124 connects the slide 119 with the base so as to hold the parts in normal position (Figure 25), and the slide 120 has a lug 125 acting against the slide 119. Levers 129, 130 and 134, pivoted on a shaft 132 and operated as hereinafter described, act against shoulders on the slides 119 and 120, the lever 129 acting against a shoulder on the slide 119 only, and the levers 130 and 134 acting against shoulders on the slide 120 (Figure 9).

With the mechanism so far described, we can now proceed to the particular mechanisms for securing, respectively, the operations of simple multiplication without addition of the products, with addition of the products, the taking of a sub-total, the taking of a total, the subtraction from a product or a series of products of another item, and the addition to a product or a series of products of another item.

*Non-adding*

The machine is placed in a condition where the product of two numbers set up on the keyboards is simply printed without setting the same for subsequent accumulation to another product or products. To secure this result, the "Non-add" key C (Figures 1 and 3) is depressed. The mechanism for securing the desired result is more particularly shown in Figures 13, 14 and 15 (see also Figures 3 and 25).

The shank 10 of the non-adding key C has a pin 201 engaging a bell crank lever 199 pivoted in the unit 7, 8, 9 and connected to one end of a link 203 having a pin and slot connection 204 at its other end with the link 99. The link 203 is also connected with a three armed lever 198, one of whose arms has a pin and slot connection 197 with the link 80. This link 80 has a lug 196 extending over the rams 65 and 66 and arranged to act against a shoulder 195 on the ram 65 and enter a slot 209 when the link 80 is down. When, however, the link is in raised position, the lug 196 acts between shoulders 210 in the ram 66. A spring 133 tends to hold the link 80 down. The key shank may, as usual, be provided with a notch 212 arranged to act into the edge of the top part 7 when the key is depressed, so as to hold it in that position.

Figure 15:
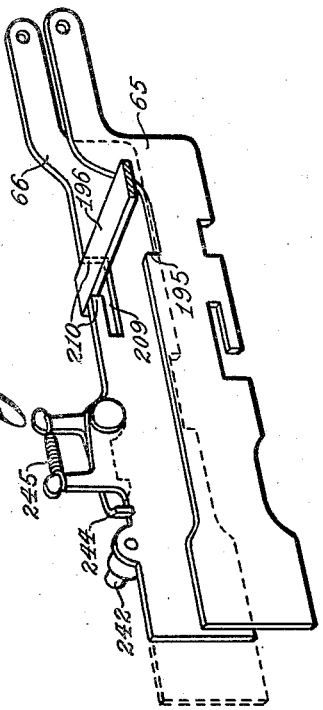
Figures 13, 14 and 15 are perspective views, showing the mechanism for rendering the machine non-adding.
Figure 13:
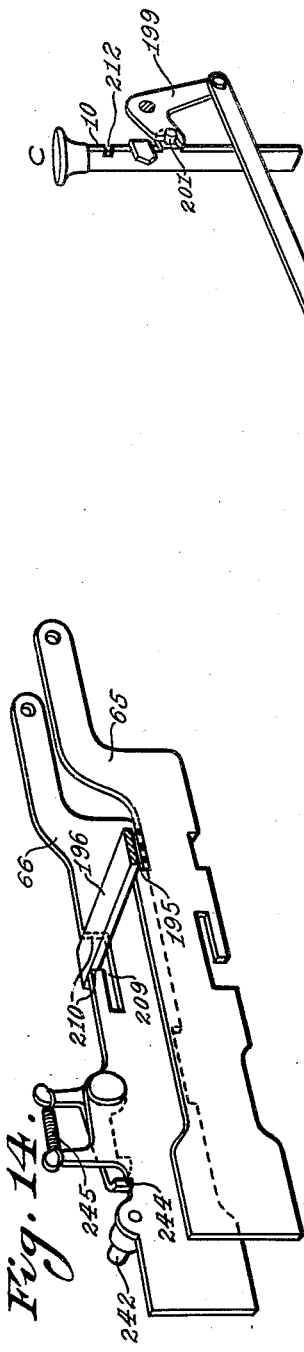
Figure 14:
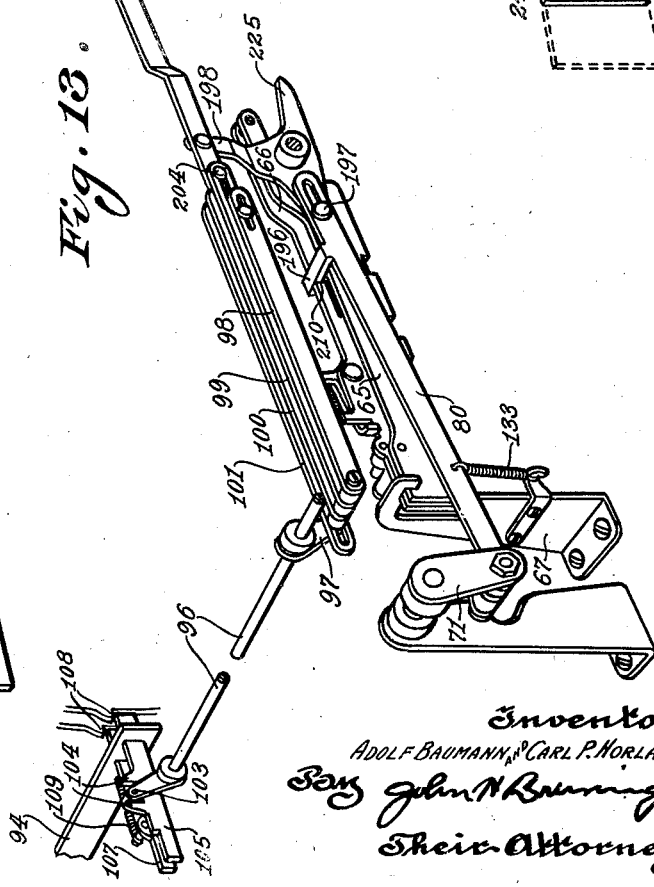
Figures 27, 28:
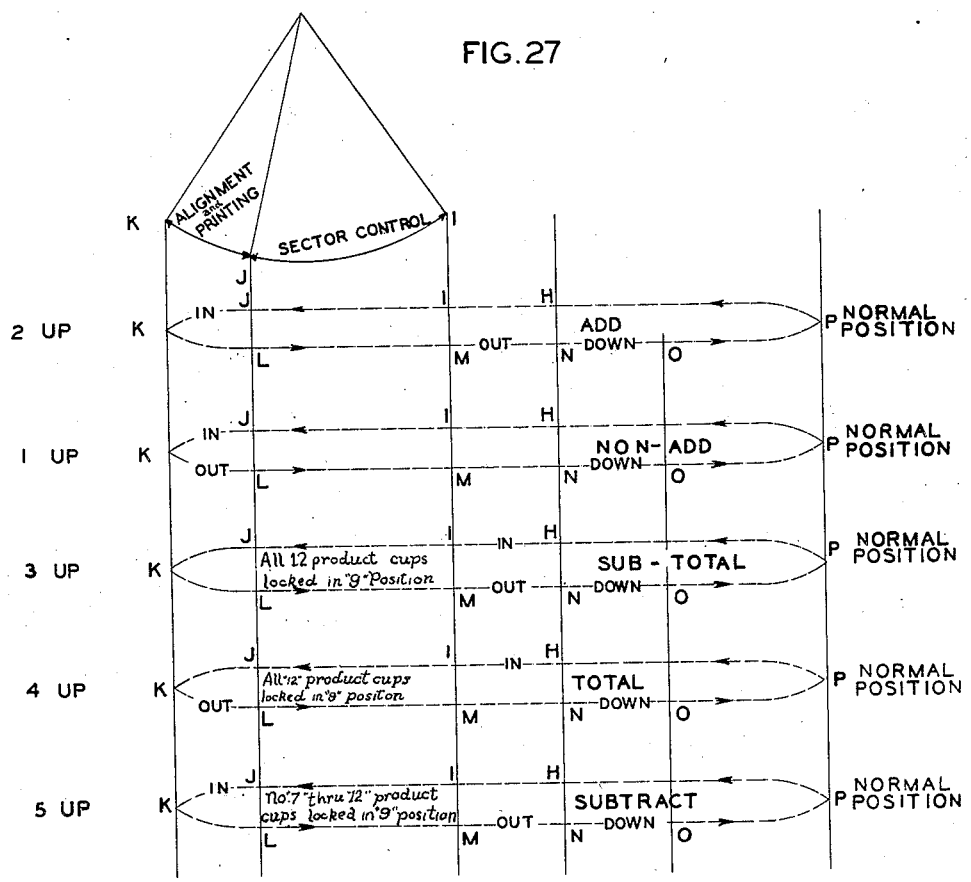
Figure 27 is a diagrammatic view, showing totalizer control.
Fig. 28 is a view showing computations which may be performed with this machine.

When the "Non-add" key C is depressed, thereby moving the mechanism to the position of the parts shown in Figures 13, 14, and 15, the operation of the mechanism will be as shown at (1) Figure 27. The parts are in normal position at the point P. As now a multiplier and a multiplicand are set on the keyboard and the various partial products consolidated into the final product, the latter will appear at the printing line on the platen and will be printed in connection with the multiplier and multiplicand. As the various sectors 30 move from I to J, no movement of the carrier 35 will take place. As the sectors, however, come to rest at J and during the period from J to K and K to L, at which time the type bars are alined and printing takes place (as described in Patent No. 1,886,148), the carrier 35 is oscillated to mesh the pinions 37 alternately with the sectors 30 and the racks 44. This is accomplished by what now amounts to a direct connection between the ram 66 and the link 80 (Figure 13), without lost motion, there being no connection of the link 80 with the ram 65 at this time. At the close of the period J, K, L, therefore, during which time the sectors 30 are stationary, the pinions 37 have moved into and again out of mesh with the sectors, without receiving any movement therefrom, the movement from L to M (Figure 27) taking place after the pinions 37 have moved out of mesh with the sectors 30. Accordingly, the product will not be set into the accumulator, but it will be simply printed in connection with the multiplier and the multiplicand; accordingly, no addition takes place.

At this point it will also be convenient to explain the operation of the carrier mechanism. Upon reference to Figure 27, it will be noted that at the point K, when the pinions 37 are in mesh with the sectors 30, the racks 44 are moved up. These racks remain in that position until point N is reached, and during the period N to O (position 2), the racks 44 are permitted to move down if any of them have been previously released. It will be noted that, upon clearing of the machine or taking of a total or sub-total as hereinafter described, these racks 44 will again be moved up and then down, so that it is always insured that an amount which has been previously set into the accumulator and which requires carrying will be carried over in any event.

Upon depression of the "Non-add" key C, the stop 93 similar to stops 105 and 107, will be shifted so as to permit the sector 91 to drop in order to position the type bearing the "Non-add" designation N at the printing point. The stops 105 and 107 will, however, not be shifted, not only on account of the lost motion between the pin 103 and the lugs 104, but also on account of the pin and slot connection 204 between the links 203 and 99. Accordingly, these stops remain in the path of teeth 108 on the highest two product sectors, thereby stopping them in their zero positions as required.

*Adding*

When the non-adding key C is released, the machine will be in a condition to set successive products into the accumulator for accumulation therein; in fact, the normal position of the machine, in which all keys are raised, is that position. This is illustrated in Figure 25 and position (2) of Figure 27. Reference can also be had to Figures 13, 14 and 15. In the normal position of parts, the lug 196 is held so as to be in the path of the shoulder 195 on the ram 65, and to lie within the slot 209 of the ram 66. Upon reference to Figure 6, it will be seen that these rams 65 and 66 are operated in succession by the cams 63 and 64, the cam 63 operating to shift the ram 65 to the left (Figure 25) during the period H to I (Figure 27 (2)) and to the right during the period M to N. The cam 64, however, shifts the ram 66 to the left during period J to K and to the right during period K to L.

It will be seen that during period H to I, there is no movement of the link 80, for the shoulder 195 simply slides away from the lug 196. During period J to K, the ram 66, in moving to the left (Figure 25) will, by engagement of the right shoulder 210 with the lug 196, shift the link 80 so as to move the carrier 35 with the pinions 37 thereon into engagement with the sectors 30. This is accomplished after the sectors have been shifted in accordance with the product set up. On the return of the ram 66 during the period K to L, the slot 209 (Figure 25) will simply move over the lug 196 so that the pinions will remain in mesh with the rack even during the period L to M, at which time the sectors are returned to normal positions. The product will, therefore, be set into the accumulator. During period M to N, the return of the ram 65 will cause the shoulder 195 thereon to engage the lug 196 and move the carrier 35 with its pinions 37 out of mesh with the sectors 30 and into mesh with the racks 44. Here, again, the racks are moved up at K and down during period N to O, so that carrying takes place as heretofore described.

When the machine is in normal position, there need be no indication of the type bar 88; although, if desired, a suitable indication may be provided at the normal position. The stops 105 and 107 also remain in normal position in the path of the shoulders 108, as in non-adding operation.

*Sub-total*

In the taking of a sub-total, the accumulated products previously set into the accumulator are taken and printed without, however, clearing the settings in the accumulator, so that subsequent products and items may be added to or subtracted therefrom. Mechanism for taking a sub-total is shown particularly in Figures 16, 17 and 18 in connection with Figures 3, 25 and 27 (3).

The shank 10 of the "Sub-total" key D has a pin 217 engaging a bell crank lever 218 pivoted in the unit 7, 8, 9 and connected by a link 219 with a three armed lever 220, which in turn has a pin and slot connection 221 with the link 81. This link has a lug 222 arranged to take into a notch 223 in the ram 65. The lever 220 has a lug 224 acting over the arm 225 of the lever 198. The lever 220 has the arm 130, which, as previously described, is in the path of a shoulder on the slide 120. The link 219 is further connected with the link 100 through a pin and slot.

In the normal position of the parts shown, the link 81 is down so that the lug 222 thereon is out of engagement with the ram 65, while, as previously explained, the lug 196 is within the slot 209. Upon depression of the "Sub-total" key D, however, the link 81 is elevated so as to engage the lug 222 with the notch 223 of the ram 65, while the shifting of the bell crank lever 220 in a clockwise direction depresses the lug 224 thereon so as to engage the arm 225 of the three armed lever 198, so as to raise the lug 196 wholly free of the ram 66. Since the ram 65, which is the only one now active for shifting the carrier, is moved to the left during the period H to I, and to the right during the period M to N; it will be seen that the carrier 35 is moved with its pinions 37 into mesh with the sectors 30 before they move down, and these pinions remain in mesh until after the sectors are returned.

Assuming now that a number of products or other items have been set into the accumulator, upon depression of the "Sub-total" key D and upon operation of the machine, the sectors 30 are moved down while the pinions 37 are in mesh therewith. These pinions are, therefore, rotated until the teeth 50 thereon engage the pawls 51, with the result that the accumulator reading is set into the type bars 128 connected with the sectors 30. This reading is printed during the period J to K. The pinions, however, remain in mesh with the sectors as these are returned, and since they are returned to the same extents to which they have shifted, the pinions are restored to their previous position, so that the total then in the accumulator is not cleared, but remains therein for the subsequent addition thereto of products or other items.

During the procedure of taking a sub-total, the stop 93 is shifted to permit the sector 91 to move down until its corresponding stop co-operates with 93 in order to shift the designating type bar to a position where it will indicate on the paper that the sub-total is being taken. At this time the stops 105 and 107 are also retracted out of the path of the stops 108, so as to permit their sectors to move to the "9" position, or to such position as may be required by the total then set up in the accumulator. The lever 130 is also shifted to move both of the slides 119 and 120 and, thru the cam slots 122, the bars 114 and 115, in order to arrest the heads 110 in the "9" position.

During the taking of a total, it is necessary that the arm 214, operated by a link 211, as described in U. S. Patent No. 1,886,148, be held against movement, in order to prevent shifting of the bars 22. Referring to Figures 5, 16 and 25, arranged to be projected in the path of the arm 214 is a plunger 226 carried by a bell crank lever 227 mounted on the frame 2. The lever has its end 228 held by a spring 229 in the path of a shoulder 231 on the link 219. Accordingly, as the "Sub-total" key D is depressed, the plunger is moved into the path of one of the arms 214, so as to hold the bars 22 in their normal positions.

*Total*

In taking a total of a series of products or other items, set into the accumulator, the total then appearing is set into the type bars and printed, and thereafter the accumulator is restored to zero position. To accomplish this result, the pinions 37 are moved into mesh with the sectors 30 before the latter are set and are again moved out of mesh before the sectors are returned.

Figure 27 (4) shows the movements of the parts, the pinions moving into mesh with the sectors during the period H to I and out of mesh therewith during the period K to L; while the racks 44 are moved up at position K and down during the period N to O, as in the previous examples. Here, again, all the product heads 110 are arrested in the "9" position, while the two sectors 30 of the highest order are again released to permit them to move to the extreme "9" position, if necessary.

Mechanism for accomplishing this is particularly shown in Figures 19, 20 and 21, reference also being had to Figures 3, 8 and 25. The shank 10 of the "Total" key E has a pin 232 engaging one arm of a bell crank lever 233, the other arm of which is connected to one end of a link 234, the other end of which is connected with the link 101. The link 234 is also connected with a three armed lever 235, one of whose arms 134 has previously been described as acting behind a shoulder on the slide 120. A laterally extending lug 236 on the lever 235 acts on an arm 225 on the lever 198, which connects with the link 80 carrying the lug 196. The link 82 has a laterally extending lug 246 and has its end bearing in a fork 237 on the lever 235. This link 82 also has a laterally projecting pin 238 in the path of one arm of a lever 239 pivoted on a frame part 240 (Fig. 1) and provided at its other end with a cam face 144 in the path of a pin 242 on the ram 66, the end of the arm having a straight portion 243. A latch 244 pivoted on the ram 66 has a laterally projecting lug bearing on the upper edge of the ram and is under the tension of a spring 245. This latch is provided with a notch arranged to be engaged by a laterally projecting lug 247 on the link 82. The lug 246 on the link 82 is arranged to be received in a slot 248 in the ram 65 and between shoulders 249 therein. The bell crank lever 227, 228, previously referred to, is arranged to be struck by a shoulder 250 on the link 234. The link 82 is normally in position with its lug 246 below the ram 65.

Upon depression of the "Total" key E, the link 82 is raised so as to place its lug 246 between the shoulders 249 of the ram 65, while the link 80 is raised so that its lug 196 entirely clears the ram 66. The link 81 is normally in dropped position, so that its lug 222 (Fig. 16) will clear the ram 65. As the ram 65 moves from the position H to I (Figure 27 (4)), the link 82 is carried with it, so as to move cam plate 38 and the carrier 35 with its pinions 37 into mesh with the sectors 30. This takes place before the sectors move down, so that during the subsequent movement of these sectors, the total set in the accumulator at that time is set into the sectors, which are arrested by the engagement of the teeth 50 with the pawls 51, as in the taking of a sub-total, so that the total then in the accumulator is printed. During this movement of the link 82, the pin 238 thereon moves over the arm 239, as shown in Figure 21. As now the ram 66 moves back, its pin 242, by engagement with the cam 243 on the lever 239, will shift the lever 239 against the tension of its spring 241 (Fig. 8), so as to elevate the link 82 and place the lug 246 within the slot 248, as well as move the lug 247 into the path of the notch of the latch 244. The notch in the latch is long enough so as to permit limited movement of the latch over the lug 247, while the pin 242 slides on the straight portion of cam 243. As the ram 66 now returns, during the period K to L, the link 82 will be carried with it, while the lug 246 slides in the slot 248. As soon as the pin 238 reaches the end of the lever 239, it again becomes disengaged, while the subsequent return of the ram 65 during the period M to N alines the end of the slot 248 with the lug 246, so that this lug can again drop between the shoulders 249 and permit the link 82 to drop to original position.

It will be understood that upon depression of the key E, the stop 93 is shifted through the medium of the link 101 so as to arrest the sector 91 connected with the type bar 88 in order to place a proper total designation at the printing point. The lever 134 will, of course, operate to arrest all the accumulator heads 110 in the "9" position, while the stops 105 and 107 are also retracted to permit the two segments of the highest order to move to the extreme position as required.

Subtraction

The operation of this mechanism is based upon the following principle: If a number is multiplied by the complement of one, to say, six places and the product is added to another number, then the same will be equal to the difference between these numbers to the corresponding six places. Let us take, for instance, the number 125 to be subtracted from, say, 250. The computation will then be as follows:

$$\begin{array}{r}250\\999999\times 125=124999875\\\hline 125000125\end{array}$$

It will be seen that the result is the difference between 250 and 125 to six places from the right; however, if the above item be set into an accumulator having over six digits or orders, then there will be an error beginning with the seventh place from the right in the above example. In accordance with the illustrated embodiment of this invention, means is provided for correcting the integrating means to correct the complement setting of the number set into the machine. This is accomplished by setting those elements (into which the final product is set) in excess of the orders of the 999999, to the "9" position.

In accordance with this invention, therefore, mechanism is provided, adapted upon depression of the "Subtraction" key F to secure the effect of setting in the machine a multiplier 999999; upon then setting the item to be subtracted on the multiplicand keyboard, the complement will be set into the machine, and then, upon taking a total or a sub total, the difference will be printed.

Referring to Fig. 22 in connection with Figs. 3 and 25, the shank 10 of the subtraction key F is provided with a pin 252 engaging a bell crank lever 253 mounted in the unit 7, 8, 9, connected at one end to a link 254, the other end of which is attached to the link 98 through a pin and slot connection 255. The link 254 is also connected to one end of the lever 256 pivoted on the frame, the other end of which forms the lever 129 previously described as engaging a shoulder on the slide 119 connected to shift the bar 114, whose lugs 113 arrest the product heads 110 in orders 7 to 12 at their "9" position. At this time the link 81 is in a position where the lug 222 (Fig. 16) is free of the ram 65 while the lug 196 is within the slot 209 of the ram 66 and is susceptible of engagement by the shoulder 195, for the reason that the mechanism is now in adding position. The shank 10 of the subtraction key F also has a cam 257 (Fig. 11) engaging a pin 258 on a link 358 guided by a bracket 359 on the wall 9 (Fig. 3) and connecting with a yoke 259 pivoted at 260 to the cross-pieces 5 and 6. This yoke has an arm 261 engaging a lug 262 on the bar 31 of the multiplier section, so as to free the keys in that section as described in Patent No. 1,886,148. The purpose of this is to restore all keys in the multiplier section, so as to permit settings to "9" position of all multiplier bars 22 as hereinafter described.

The shank 10 further has a pin 263 (Fig. 11) engaging a bell crank lever 264 connected to a bell crank lever 266 through the parallel bars 265, both of these levers being pivoted on the cross-piece 6. The connected levers and bars insure parallel movement of the upper bar 265. The upper bar 265 extends beneath the toes of levers 267 pivoted in each unit 7, 8, 9 of the multiplier bank and connected by a link 268 with the parallel bar 26 (Fig. 2) to which is connected the stop 25. Accordingly, upon depression of the subtraction key F, the multiplier bars 22 are permitted to move to their maximum limits, corresponding to their "9" position.

Referring to Figs. 22 and 24, and also to Figs. 1, 3, 5, 11, 12 and 25, the bell crank lever 264 has a pin and slot connection with the arm 269, having a connected arm 270 in turn connected by a link 271 to a lever 272 connected to shift a bar 273. This bar which is guided on the frame has notched flange portions 274 overlying the hammers 141 for the multiplier and product type bars; these hammers are constructed and arranged as in Patent No. 1,886,148. When the subtraction key F is in normal or raised position, the notches in the flange portions permit the hammers to move therethrough to operate and strike the type bars. When, however, the subtraction key is depressed, the hammers for the multiplier and product type bars are held inactive, so that no printing by the corresponding type bars will take place.

Upon depression of the subtraction key F, the multiplier keyboard is cleared, while the stops 25 for the multiplier section are released in order to permit the bars 22 to move to their "9" position, the plunger 226 (Fig. 5) being at this time retracted to release the arm 214. The stops 113 on bar 114 in the orders 7 to 12 are also at this time in position to stop the product heads 110 in their "9" position, while the stops 105 and 107 permit the sectors of the two highest orders to move to the "9" position; the stop 93 (Fig. 25) will also be in a position to engage the proper stop on the sector 91, in order to position the proper subtraction designation at the printing line. An item to be subtracted, such as 125, can now be set on the multiplicand keyboard, and upon depression of the trip bar 3, this amount multiplied by the complement of 1 will appear at the sectors 30 and will be set into the accumulator, except that all orders of the product above 6 will appear as nines and set as such into the accumulator. This will set into the accumulator as indicated in Fig. 27 (5), the pinions 37 moving in mesh with the sectors 30 during the period J to K and out of mesh during the period M to N, as in the regular addition previously described. The final accumulation will, however, show a subtraction of the item such as 125. This final result can be made to appear at the printing line by depression of the "Sub-total" or "Total" key, depending upon whether a sub-total or total is desired. On account of the interposition of the bar 274, only the item subtracted and set on the multiplicand keyboard is printed, while printing devices for the other keyboard and for the product are eliminated.

Addition

In accordance with this invention, mechanism is provided whereby, upon depression of an "Addition" key and the setting up on the multiplicand keyboard of a number which it is desired to add, this number will be set into the machine as a product and added into the accumulator. Referring to Figs. 1, 4, 23 and 24, arranged between the multiplier and multiplicand sections is a key G which is adjacent to and connected to depress the "1" unit multiplier key. The shank 10 of G is provided with a laterally extending lug 275 arranged to engage the pin 276 on the opposite side of the "1" key shank from the latch 16 as employed in Patent No. 1,886,148. The key G is held in raised position by a spring 277 anchored to the key shank and to a laterally projecting pin 278 (Fig. 4) on the wall 8. The key shank is also provided with a notch 212, whereby upon engagement with the wall 7, it may be held in depressed position.

Referring to Figs. 4, 23, 24, 25, and 26, the shank of key G has a pin 279 engaging a fork in one arm of a bell crank lever 353 the other arm of which is connected by a link 354 with the arm 97 secured to the stop control shaft 96, there being a pin and slot connection between link 354 and bell crank lever 353 similar to those between links 254 and 98, etc. The shank of key G also has a pin 280 engaging a fork in an arm 364 fixed to a shaft 365 on which is an arm 366 connected by a link 371 with the lever 272. Upon reference to Figs. 24 and 26 it will be seen that the links 271 and 371 engage a pin 372 on the lever 272, the link 371 being slotted to receive said pin, while a spring 373 holds the bar 273 in one extreme position and against one of its supporting brackets 374. Accordingly the lever 272 and the bar 273 may be shifted by the key G through its connections including the link 271 independently of the subtraction key F and its connections including the link 271.

Upon depression of the adding key G, the machine will set into the product heads 110 any number set up on the multiplicand keyboard; accordingly, additions may be performed by successively operating the trip bar. These items will be successively added into the accumulator due to the fact that the machine is normally in the position for adding, the operations being as shown in Figs. 25 and 27 (2) previously described.

Upon depression of the adding key not only will the connections including the link 371 of bar 273 operate to eliminate printing of the product, but also of the multiplier "1" which may then appear in the machine, so that the number to be added will only appear under the multiplicand listing; but the link connection 354 will also serve to set the sector 89 and, therefore, the type bar 88 to give the corresponding designation.

Miscellaneous mechanisms

In this machine, as in the machine of Patent No. 1,886,148, "Clear" and "Repeat" keys are provided, the "Clear" key being shown at A (Figs. 1 and 3) and the "Repeat" key at B. A "Clear" key may also be provided for the multiplicand section, as shown in Fig. 1, at B B.

Mechanism is also provided holding down any properly depressed key C, D, E or F, or restoring any key not properly depressed. For that purpose, each key shank 10 is provided with a lug 281 (Fig. 3) in the path of a corresponding lug 282 on a bar 283 having slots engaged by pins 284 on the wall 8 of the unit 7, 8, 9. The bar 283 has a pin and slot connection with an arm 285 having a connected arm 286 in turn connected by a link 287 with an arm 288 on a shaft 202, the shaft 202 being operated through suitable mechanism as described in Patent No. 1,886,148. Accordingly, upon operation of the machine, a lug 282 will slide over the corresponding lug 281 of a properly depressed key C, D, E or F, and hold it in locked position, while the other lugs 282 will take under the corresponding lugs 281 of the other keys and hold them against depression. It will be noted that the lugs 281 and 282 are beveled; accordingly, any key which is not fully depressed will be completely depressed, but other slightly depressed keys will be raised.

Referring to Fig. 3, arranged below the key shanks 10 of the keys C, D, E and F, and attached to the bottom of the unit 7, 8, 9, is a trough 400 containing balls 401; these balls are retained in the trough by end pieces 402. The trough is slotted as shown to permit passage therethrough of the key shanks when depressed; the balls, however, are so arranged and the length of the trough is such that while a single key shank may pass between a pair of balls in the trough, this will cause the trough to be filled endwise; accordingly, depression of another key is prevented.

Referring to Figs. 3, 5, 11 and 25, the arm 288 has a cam 205 arranged to engage the arm of a lever 207 connected to operate the bar 296 connected to clear both the multiplier and multiplicand sections as described in the above-mentioned patent. The lever 207 is connected by a spring 289 with the extension of the bar 296 and has a pin and slot connection therewith, as shown in Fig. 25. A spring 290 connects the post 291 on the bar 296 with a post 293 attached to the cross-piece 5, the bar 296 being slotted to take over this post. The bar 296 is, therefore, operated positively in one direction and yieldingly in the other. The cam 294 is also arranged to engage a pin 295 on a bar 292 connected to lock the keyboard as described in said patent.

Résumé of computations

Fig. 28, which is a view of a record strip, shows the general character of computations possible. It will be noted in this connection, that the print bar 88, Fig. 1, has a series of designations, such as "*", for total, indicating also that the machine is clear; "s" for sub-total; "n" for non-adding or non-accumulating; "+" for addition, and "—" for subtraction; these indications are moved to the printing line upon depression of the various keys as heretofore explained.

Normally the machine is in condition to set into the accumulator for accumulation therein the various items set into the machine so that no designation is necessary nor indicated on the record strip, Fig. 28, for those items. If it is now desired to multiply, for instance, certain numbers without adding the same to the other items set into the machine, this can be accomplished by the depression of the non-add key C; examples are shown in Fig. 28, at the designation "n". By depression of the subtraction key F, a number to be subtracted can be set in the multiplicand keyboard and this number will then appear in the multiplicand column on the record, Fig. 28, while the "—" designation also appears; this number will then be subtracted as previously described and as appears in the example, Fig. 28. Similarly, upon depression of the addition key G the number as well as its designation will appear on the record and the same will be added as appears in Fig. 28. Upon depression of the sub-total key D, the amount then appearing in the accumulator will be printed, in connection with the corresponding designation "s" while the amount will be maintained in the machine as shown in Fig. 28. Upon depression of the total key E, however, the total will be printed in connection with its designation "*", while the machine will be cleared as will also be seen from Fig. 28.

The keys A and B B, Fig. 1, perform the function of clearing the setting each of its particular keyboard sections while the blank keys in front of the "1" keys each performs its function of clearing its particular bank. The key B, Fig. 1, performs the function of maintaining the setting of the multiplier section and permitting it to be repeated. These features are fully described in Patent No. 1,886,148, previously referred to.

It will, therefore, be seen that the invention accomplishes its objects. A machine is provided whereby computations of various kinds may not only be performed expeditiously but conveniently. To accomplish the various operations of subtraction and addition, as well as multiplication, it is not necessary to provide separate machines, nor even separate and distinct mechanisms, but those operations are capable of performance by selective manipulative means which converts the machine at will for the performance of the desired computations. All of these computations are printed with the items therefor, as well as the results, in tabulated form, with reference to the factors and the products as well as in listing relation with reference to successive items, the printing devices being actuated in coordination and in accordance with the settings, not only of the selective manipulative means or keyboards whereby the items are set into the machine, but also in accordance with the settings of the integrating means, the accumulating means, etc. It is to be understood in this connection that when reference is had to selective manipulative means, and to a keyboard, these expressions may in instances where the context so requires, include in addition to the actual keys, the associate mechanism forming a part of the keyboard structure. Furthermore, when accumulating means is referred to, it has reference to accumulation generally, whether negative or positive; this will be clear from the fact that a subtraction operation is mathematically the addition of a negative quantity.

While in the previous description reference has been particularly had to the operations of multiplication, and while the examples given are those of multiplication, it will be readily seen that the machine is capable of performing the operations of division; for division may be performed in a manner well known to those skilled in the art, as by the employment of reciprocals or by suitable designation of keys. It will, therefore, be understood that the terms "Multiplication", "Multiplier", "Multiplicand" and "Product", are used in their general and descriptive sense to include their reciprocals, namely, "Divisor", "Dividend" and "Quotient".

While this invention is particularly applicable to the general type of calculating machines, specifically shown and described, it will be understood that the invention is in many of its aspects applicable to other types of calculating machines. It will furthermore be understood that certain features and sub-combinations are of utility and may be employed without reference to other features and sub-combinations; that is contemplated by and is within the scope of the appended claims. It will be furthermore understood that various changes may be made in details of construction within the scope of the appended claims, without departing from the spirit of this invention. It is, therefore, to be understood that this invention is not to be limited to the specific details and operations shown and/or described.

Having thus described the invention what is claimed is:

1. In a calculating machine, the combination with selective manipulative means for setting up multiplicands and multipliers, devices controlled thereby for setting up the various resulting partial products and means for integrating the partial products, of accumulating means, selective manipulative means for controlling the operation of said devices to set in said integrating means the complement of the number set into the machine, and means for transferring such setting from said integrating means to said accumulating means for accumulation therein.

2. In a calculating machine, the combination with selective manipulative means for setting up multiplicands and multipliers, devices controlled thereby for setting up the various resulting partial products and means for integrating the partial products, of accumulating means, selective manipulative means for controlling the operation of said devices to set in said integrating means the product of the complement of one taken to the capacity of the machine and a number to be subtracted, means for correcting said integrating means to the complement setting of that number, and means for transferring the corrected setting from said integrating means to said accumulating means.

3. In a calculating machine, the combination with selective manipulative means for setting up multiplicands and multipliers, devices controlled thereby for setting up the various resulting partial products and means for integrating the partial products, means for setting one of said selective manipulative means to the complement of one while a number is set on the other of said selective manipulative means to set in the integrating means a product representing the complement of said number, and means for correcting said integrating means to the complete complement setting of that number.

4. In a calculating machine, the combination with selective manipulative means for setting up multiplicands and multipliers, devices controlled thereby for setting up the various resulting partial products and means for integrating the partial products, means for setting one of said selective manipulative means to the complement of one while a number is set on the other of said selective manipulative means to set in the integrating means a product representing the complement of said number, means for correcting Fig. 27 (5), the pinions 37 moving in mesh with the sectors 30 during the period J to K and out of mesh during the period M to N, as in the regular addition previously described. The final accumulation will, however, show a subtraction of the item such as 125. This final result can be made to appear at the printing line by depression of the "Sub-total" or "Total" key, depending upon whether a sub-total or total is desired. On account of the interposition of the bar 274, only the item subtracted and set on the multiplicand keyboard is printed, while printing devices for the other keyboard and for the product are eliminated.

Addition

In accordance with this invention, mechanism is provided whereby, upon depression of an "Addition" key and the setting up on the multiplicand keyboard of a number which it is desired to add, this number will be set into the machine as a product and added into the accumulator. Referring to Figs. 1, 4, 23 and 24, arranged between the multiplier and multiplicand sections is a key G which is adjacent to and connected to depress the "1" unit multiplier key. The shank 10 of G is provided with a laterally extending lug 275 arranged to engage the pin 276 on the opposite side of the "1" key shank from the latch 16 as employed in Patent No. 1,886,148. The key G is held in raised position by a spring 277 anchored to the key shank and to a laterally projecting pin 278 (Fig. 4) on the wall 8. The key shank is also provided with a notch 212, whereby upon engagement with the wall 7, it may be held in depressed position.

Referring to Figs. 4, 23, 24, 25, and 26, the shank of key G has a pin 279 engaging a fork in one arm of a bell crank lever 353 the other arm of which is connected by a link 354 with the arm 97 secured to the stop control shaft 96, there being a pin and slot connection between link 354 and bell crank lever 353 similar to those between links 254 and 98, etc. The shank of key G also has a pin 280 engaging a fork in an arm 364 fixed to a shaft 365 on which is an arm 366 connected by a link 371 with the lever 272. Upon reference to Figs. 24 and 26 it will be seen that the links 271 and 371 engage a pin 372 on the lever 272, the link 371 being slotted to receive said pin, while a spring 373 holds the bar 273 in one extreme position and against one of its supporting brackets 374. Accordingly the lever 272 and the bar 273 may be shifted by the key G through its connections including the link 271 independently of the subtraction key F and its connections including the link 271.

Upon depression of the adding key G, the machine will set into the product heads 110 any number set up on the multiplicand keyboard; accordingly, additions may be performed by successively operating the trip bar. These items will be successively added into the accumulator due to the fact that the machine is normally in the position for adding, the operations being as shown in Figs. 25 and 27 (2) previously described.

Upon depression of the adding key not only will the connections including the link 371 of bar 273 operate to eliminate printing of the product, but also of the multiplier "1" which may then appear in the machine, so that the number to be added will only appear under the multiplicand listing; but the link connection 354 will also serve to set the sector 89 and, therefore, the type bar 88 to give the corresponding designation.

Miscellaneous mechanisms

In this machine, as in the machine of Patent No. 1,886,148, "Clear" and "Repeat" keys are provided, the "Clear" key being shown at A (Figs. 1 and 3) and the "Repeat" key at B. A "Clear" key may also be provided for the multiplicand section, as shown in Fig. 1, at B B.

Mechanism is also provided holding down any properly depressed key C, D, E or F, or restoring any key not properly depressed. For that purpose, each key shank 10 is provided with a lug 281 (Fig. 3) in the path of a corresponding lug 282 on a bar 283 having slots engaged by pins 284 on the wall 8 of the unit 7, 8, 9. The bar 283 has a pin and slot connection with an arm 285 having a connected arm 286 in turn connected by a link 287 with an arm 288 on a shaft 202, the shaft 202 being operated through suitable mechanism as described in Patent No. 1,886,148. Accordingly, upon operation of the machine, a lug 282 will slide over the corresponding lug 281 of a properly depressed key C, D, E or F, and hold it in locked position, while the other lugs 282 will take under the corresponding lugs 281 of the other keys and hold them against depression. It will be noted that the lugs 281 and 282 are beveled; accordingly, any key which is not fully depressed will be completely depressed, but other slightly depressed keys will be raised.

Referring to Fig. 3, arranged below the key shanks 10 of the keys C, D, E and F, and attached to the bottom of the unit 7, 8, 9, is a trough 400 containing balls 401; these balls are retained in the trough by end pieces 402. The trough is slotted as shown to permit passage therethrough of the key shanks when depressed; the balls, however, are so arranged and the length of the trough is such that while a single key shank may pass between a pair of balls in the trough, this will cause the trough to be filled endwise; accordingly, depression of another key is prevented.

Referring to Figs. 3, 5, 11 and 25, the arm 288 has a cam 205 arranged to engage the arm of a lever 207 connected to operate the bar 296 connected to clear both the multiplier and multiplicand sections as described in the above-mentioned patent. The lever 207 is connected by a spring 289 with the extension of the bar 296 and has a pin and slot connection therewith, as shown in Fig. 25. A spring 290 connects the post 291 on the bar 296 with a post 293 attached to the cross-piece 5, the bar 296 being slotted to take over this post. The bar 296 is, therefore, operated positively in one direction and yieldingly in the other. The cam 294 is also arranged to engage a pin 295 on a bar 292 connected to lock the keyboard as described in said patent.

Résumé of computations

Fig. 28, which is a view of a record strip, shows the general character of computations possible. It will be noted in this connection, that the print bar 88, Fig. 1, has a series of designations, such as "*", for total, indicating also that the machine is clear; "s" for sub-total; "n" for non-adding or non-accumulating; "+" for addition, and "—" for subtraction; these indications are moved to the printing line upon depression of the various keys as heretofore explained.

Normally the machine is in condition to set into the accumulator for accumulation therein the various items set into the machine so that no designation is necessary nor indicated on the record strip, Fig. 28, for those items. If it is now desired to multiply, for instance, certain numbers without adding the same to the other items set into the machine, this can be accomplished by the depression of the non-add key C; examples are shown in Fig. 28, at the designation "*n*".

By depression of the subtraction key F, a number to be subtracted can be set in the multiplicand keyboard and this number will then appear in the multiplicand column on the record, Fig. 28, while the "—" designation also appears; this number will then be subtracted as previously described and as appears in the example, Fig. 28. Similarly, upon depression of the addition key G the number as well as its designation will appear on the record and the same will be added as appears in Fig. 28. Upon depression of the sub-total key D, the amount then appearing in the accumulator will be printed, in connection with the corresponding designation "*s*" while the amount will be maintained in the machine as shown in Fig. 23. Upon depression of the total key E, however, the total will be printed in connection with its designation "\*", while the machine will be cleared as will also be seen from Fig. 28.

The keys A and B B, Fig. 1, perform the function of clearing the setting each of its particular keyboard sections while the blank keys in front of the "*l*" keys each performs its function of clearing its particular bank. The key B, Fig. 1, performs the function of maintaining the setting of the multiplier section and permitting it to be repeated. These features are fully described in Patent No. 1,886,148, previously referred to.

It will, therefore, be seen that the invention accomplishes its objects. A machine is provided whereby computations of various kinds may not only be performed expeditiously but conveniently. To accomplish the various operations of subtraction and addition, as well as multiplication, it is not necessary to provide separate machines, nor even separate and distinct mechanisms, but those operations are capable of performance by selective manipulative means which converts the machine at will for the performance of the desired computations. All of these computations are printed with the items therefor, as well as the results, in tabulated form, with reference to the factors and the products as well as in listing relation with reference to successive items, the printing devices being actuated in coordination and in accordance with the settings, not only of the selective manipulative means or keyboards whereby the items are set into the machine, but also in accordance with the settings of the integrating means, the accumulating means, etc. It is to be understood in this connection that when reference is had to selective manipulative means, and to a keyboard, these expressions may in instances where the context so requires, include in addition to the actual keys, the associate mechanism forming a part of the keyboard structure. Furthermore, when accumulating means is referred to, it has reference to accumulation generally, whether negative or positive; this will be clear from the fact that a subtraction operation is mathematically the addition of a negative quantity.

While in the previous description reference has been particularly had to the operations of multiplication, and while the examples given are those of multiplication, it will be readily seen that the machine is capable of performing the operations of division; for division may be performed in a manner well known to those skilled in the art, as by the employment of reciprocals or by suitable designation of keys. It will, therefore, be understood that the terms "Multiplication", "Multiplier", "Multiplicand" and "Product", are used in their general and descriptive sense to include their reciprocals, namely, "Divisor", "Dividend" and "Quotient".

While this invention is particularly applicable to the general type of calculating machines, specifically shown and described, it will be understood that the invention is in many of its aspects applicable to other types of calculating machines. It will furthermore be understood that certain features and sub-combinations are of utility and may be employed without reference to other features and sub-combinations; that is contemplated by and is within the scope of the appended claims. It will be furthermore understood that various changes may be made in details of construction within the scope of the appended claims, without departing from the spirit of this invention. It is, therefore, to be understood that this invention is not to be limited to the specific details and operations shown and/or described.

Having thus described the invention what is claimed is:

1. In a calculating machine, the combination with selective manipulative means for setting up multiplicands and multipliers, devices controlled thereby for setting up the various resulting partial products and means for integrating the partial products, of accumulating means, selective manipulative means for controlling the operation of said devices to set in said integrating means the complement of the number set into the machine, and means for transferring such setting from said integrating means to said accumulating means for accumulation therein.

2. In a calculating machine, the combination with selective manipulative means for setting up multiplicands and multipliers, devices controlled thereby for setting up the various resulting partial products and means for integrating the partial products, of accumulating means, selective manipulative means for controlling the operation of said devices to set in said integrating means the product of the complement of one taken to the capacity of the machine and a number to be subtracted, means for correcting said integrating means to the complement setting of that number, and means for transferring the corrected setting from said integrating means to said accumulating means.

3. In a calculating machine, the combination with selective manipulative means for setting up multiplicands and multipliers, devices controlled thereby for setting up the various resulting partial products and means for integrating the partial products, means for setting one of said selective manipulative means to the complement of one while a number is set on the other of said selective manipulative means to set in the integrating means a product representing the complement of said number, and means for correcting said integrating means to the complete complement setting of that number.

4. In a calculating machine, the combination with selective manipulative means for setting up multiplicands and multipliers, devices controlled thereby for setting up the various resulting partial products and means for integrating the partial products, means for setting one of said selective manipulative means to the complement of one while a number is set on the other of said selective manipulative means to set in the integrating means a product representing the complement of said number, means for correcting said integrating means to the complete complement setting of that number, printing means connected to be set by said selective manipulative means, and means for rendering ineffective the printing device whose selective manipulative means is set to the complement.

5. In a calculating machine, the combination with multiplicand and multiplier keyboards, devices controlled thereby for setting up the various resulting partial products and means for integrating the partial products, of accumulating means, a subtraction key connected to control one of said keyboards to cause said devices to set in said integrating means the complement of the number set up on the other keyboard, and means for transferring such setting from said integrating means to said accumulating means.

6. In a calculating machine, the combination with multiplicand and multiplier keyboards, devices controlled thereby for setting up the various resulting partial products and means for integrating the partial products, a subtraction key connected to effect nine settings in one of said keyboards while a number is set on the other keyboard to set in the integrating means a product representing the complement of said number, and means for correcting said integrating means to the complete complement setting of that number.

7. In a calculating machine, the combination with multiplicand and multiplier keyboards, devices controlled thereby for setting up the various resulting partial products and means for integrating the partial products, a subtraction key connected to effect nine settings in one of said keyboards while a number is set on the other keyboard, printing means connected to be set by said keyboards, and means operated upon setting of said subtraction key adapted to render ineffective the printing means for the keyboard controlled by said subtraction key.

8. In a calculating machine, the combination with multiplicand and multiplier keyboards, devices controlled thereby for setting up the various resulting partial products and means for integrating the partial products including elements into which the final product is set, of a subtraction key connected to control one of said keyboards to cause said devices to set in said elements the complement of the number set up on the other keyboard.

9. In a calculating machine, the combination with selective manipulative means for setting up multiplicands and multipliers, of devices controlled thereby operating to set up a product equal to the complement of the number set on said selective manipulative means, accumulating means, and means for transferring such complement from said devices to said accumulating means.

ADOLF BAUMANN.
CARL P. HORLACHER.